United States Patent
Lei et al.

(10) Patent No.: US 11,470,649 B2
(45) Date of Patent: Oct. 11, 2022

(54) TRANSMISSION GAP CONFIGURATION FOR RANDOM ACCESS MESSAGES

(71) Applicant: QUALCOMM Incorporated, San Diego, CA (US)

(72) Inventors: Jing Lei, San Diego, CA (US); Peter Gaal, San Diego, CA (US); Joseph Binamira Soriaga, San Diego, CA (US); Wanshi Chen, San Diego, CA (US); Seyong Park, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/742,597

(22) Filed: Jan. 14, 2020

(65) Prior Publication Data

US 2020/0275492 A1    Aug. 27, 2020

Related U.S. Application Data

(60) Provisional application No. 62/809,505, filed on Feb. 22, 2019.

(51) Int. Cl.
*H04W 74/08* (2009.01)
*H04W 56/00* (2009.01)
(Continued)

(52) U.S. Cl.
CPC ....... *H04W 74/0833* (2013.01); *H04L 5/0094* (2013.01); *H04L 27/2607* (2013.01);
(Continued)

(58) Field of Classification Search
CPC ........... H04W 74/0833; H04W 56/001; H04W 72/0446; H04W 74/0808; H04W 74/0891;
(Continued)

(56) References Cited

U.S. PATENT DOCUMENTS

2008/0274727 A1* 11/2008 Axnas ............... H04L 25/03178
455/226.1
2011/0038267 A1* 2/2011 Smith ................. H04L 43/0811
370/248
(Continued)

FOREIGN PATENT DOCUMENTS

EP          3836464 A1 *  6/2021   ........... H04L 5/0053
WO   WO-2015070383 A1 *  5/2015   ........... H04L 45/245
(Continued)

OTHER PUBLICATIONS

"Procedures for Two-Step RACH", 3GPP Draft; R1-190978, vol. RAN WG1, No. Athens, Greece; Feb. 25, 2019-Mar. 1, 2019 Feb. 16, 2019 (Year: 2019).*
(Continued)

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described in which a UE may determine a time duration of a transmission gap between a random access preamble and random access payload. The time duration of the transmission gap may be based on a configuration of the random access channel resources, a timing adjustment (e.g., an estimated propagation delay) for uplink transmissions from the UE, a beam management procedure at the UE and/or the base station, or combinations thereof. The UE may select an initial transmission gap duration based on the configuration of the random access channel resources, and may adjust the initial transmission gap duration based on the timing adjustment. Multiple UEs may be configured such that random access channel transmissions align with a random access occasion (RO) window. A base station may decode messages
(Continued)

from multiple UEs using joint or successive decoding to recover the corresponding random access messages.

47 Claims, 27 Drawing Sheets

(51) Int. Cl.
*H04L 5/00* (2006.01)
*H04L 27/26* (2006.01)
*H04W 72/04* (2009.01)

(52) U.S. Cl.
CPC ..... *H04W 56/001* (2013.01); *H04W 72/0446* (2013.01); *H04W 74/0808* (2013.01)

(58) Field of Classification Search
CPC ............. H04W 56/0045; H04W 16/14; H04W 56/002; H04W 28/16; H04W 76/28; H04L 5/0094; H04L 27/2607; H04L 1/1887; H04L 5/0053; H04L 5/0091; H04B 1/7103; H04B 7/0695
See application file for complete search history.

(56) References Cited

U.S. PATENT DOCUMENTS

| | | | | |
|---|---|---|---|---|
| 2013/0238738 | A1* | 9/2013 | Yu | H04L 51/00 709/206 |
| 2014/0269605 | A1* | 9/2014 | Pecen | H04L 27/2678 370/330 |
| 2014/0341018 | A1* | 11/2014 | Bhushan | H04L 1/0612 370/230 |
| 2015/0124837 | A1* | 5/2015 | Saltsidis | H04L 47/827 370/419 |
| 2015/0289292 | A1 | 10/2015 | Sun et al. | |
| 2016/0302165 | A1* | 10/2016 | Da | H04W 56/001 |
| 2016/0309518 | A1* | 10/2016 | Patel | H04W 74/0891 |
| 2017/0063672 | A1* | 3/2017 | Chhabra | H04L 41/0663 |
| 2017/0289018 | A1* | 10/2017 | Iyer | H04L 41/0823 |
| 2019/0089627 | A1* | 3/2019 | Mirsky | H04L 45/22 |
| 2019/0159179 | A1* | 5/2019 | Liu | H04L 5/0091 |
| 2019/0342874 | A1* | 11/2019 | Davydov | H04W 72/0413 |
| 2020/0100286 | A1* | 3/2020 | Xu | H04W 72/1268 |
| 2020/0267772 | A1* | 8/2020 | Jung | H04W 74/006 |
| 2020/0267773 | A1 | 8/2020 | Islam | |
| 2020/0383147 | A1* | 12/2020 | Yoon | H04L 27/2607 |
| 2021/0212154 | A1* | 7/2021 | Yan | H04W 76/28 |

FOREIGN PATENT DOCUMENTS

| | | | |
|---|---|---|---|
| WO | WO-2019210185 A1 * | 10/2019 | ........... H04B 7/0695 |
| WO | WO-2020154886 A1 | 8/2020 | |
| WO | WO-2020163160 A1 * | 8/2020 | ........ H04W 74/0833 |

OTHER PUBLICATIONS

"Channel Structure for Two-Step RACH", R1-1902977, vol. RAN WG1, No. Athens, Greece; Feb. 25, 2019-Mar. 1, 2019, Feb. 16, 2019 (Year: 2019).*
"On Channel Structure for Two-Step RACH", R1-1902165, vol. RAN WG1, No. Athens, Greece; Feb. 25, 2019-Mar. 1, 2019, Feb. 16, 2019 (Year: 2019).*
International Search Report and Written Opinion—PCT/US2020/013679—ISA/EPO—dated Mar. 25, 2020.
Qualcomm Incorporated: "Channel Structure for Two-Step RACH", 3GPP Draft, 3GPP TSG-RAN WG1 Meeting #96, R1-1902977, Channel Structure for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600674, 10 pages, Retrieved from the Internet: URL: http://www.3gpp.org/ftp/tsg%5Fran/WG1%5FRL1/TSGR1%5F96/Docs/R1%2D1902977%2Ezip [retrieved on Feb. 16, 2019], section 2.1-section 2.3.
Qualcomm Incorporated: "Procedures for Two-Step RACH," 3GPP Draft, 3GPP TSG-RAN WG1 Meeting #96, R1-1902978, Procedures for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens. Greece, Feb. 25, 2019-Mar. 1, 2019, Feb. 16, 2019 (Feb. 16, 2019), XP051600675, 9 pages, Retrieved from the Internet: URL: http://www.3gpp.org/ftp/tsg%5Fran/WG1%5FRL1/TSGR1%5F96/Docs/R1%2D1902978%2Ezip, [retrieved on Feb. 16, 2019], section 2, section 3, section 5.
Sony: "On Channel Structure for Two-Step RACH", 3GPP Draft, 3GPP TSG RAN WG1 Meeting #96, R1-1902165—TWOSRACH, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051599860, 4 pages, Retrieved from the Internet: URL: http://www.3gpp.org/ftp/tsg%5Fran/WG1%5FRL1/TSGR1%5F96/Docs/R1%2D1902165%2Ezip [retrieved on Feb. 16, 2019], Proposal 5, figure 2.

* cited by examiner

Configuration Information 215

Random Access Message 220

Random Access Response 225

TRANSMISSION GAP CONFIGURATION FOR RANDOM ACCESS MESSAGES

CROSS REFERENCE

The present Application for Patent claims the benefit of U.S. Provisional Patent Application No. 62/809,505 by LEI et al., entitled "TRANSMISSION GAP CONFIGURATION FOR RANDOM ACCESS MESSAGES," filed Feb. 22, 2019, assigned to the assignee hereof, and expressly incorporated herein.

BACKGROUND

The following relates generally to wireless communications, and more specifically to transmission gap configuration for random access messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support one or more random access procedures for communication between a UE and a base station, which may be used in an initial access procedure to establish a connection between the UE and base station, a connection re-establishment procedure, a handover procedure, a synchronization procedure, or any combinations thereof. The random access procedures may involve a series of handshake messages exchanged between the UE and the base station. Random access procedures may be contention-based using a shared pool of resources and preamble sequences, or non-contention based where a UE may transmit one or more messages based on a reserved preamble sequence or set of resources. In some implementations (such as unlicensed spectrum band operations), the UE may perform channel sensing (such as a listen-before-talk (LBT) procedure) before transmitting one or more messages on available resources of the channel, as part of the exchange.

As demand for communication access increases, a wireless communications system may support methods for reducing the number of handshake messages exchanged between a UE and a base station. The shortened random access procedure may reduce potential delays for channel access, particularly for contention-based procedures. Efficient techniques for performing such random access procedures may help to enhance network efficiency.

SUMMARY

The described techniques relate to improved methods, systems, devices, and apparatuses that support transmission gap configuration for random access messages. In a two-step random access procedure, a user equipment (UE) may transmit to a base station a single initial random access message. In some cases, the single random access message may include a random access preamble and a random access payload, which may be transmitted in non-contiguous resources. In response to the initial random access message, the base station may transmit to the UE a single response message, such as a random access response message. In some cases, the random access payload may have one or more transmission parameters that are different than transmission parameters of the random access preamble, which may result in a transmission gap between the preamble and payload transmissions. Various aspects of the present disclosure provide techniques for configuring such a transmission gap within a random access message.

According to the techniques described herein, the UE may be configured with a transmission gap between an ending time of the random access preamble and a starting time of the random access payload. The time duration of the transmission gap may be based at least in part on a configuration of the random access channel resources, a timing adjustment for uplink transmissions from the UE to a base station, or any combinations thereof. In some cases, the UE may select an initial transmission gap duration based at least in part on the configuration of the random access channel resources, and may adjust the initial transmission gap duration based at least in part on the timing adjustment (e.g., based on an estimated propagation delay between the UE and the base station) to obtain the time duration of the transmission gap. In some cases, the initial transmission gap duration may be determined based on a guard time of the random access preamble, an error vector measurement (EVM) window of the random access payload, a transient period time mask duration, a channel occupancy time of the random access message, an outcome of a listen-before-talk (LBT) procedure, or any combinations thereof. In some cases, the initial transmission gap duration may be selected from a set of available transmission gap durations (e.g., from a preconfigured table of initial transmission gap durations that are mapped to different combinations of values of parameters).

In some cases, a base station may configure multiple UEs with random access channel resources, and may monitor random access channel (RACH) occasions (ROs) for transmissions of one or more UEs. In some cases, multiple UEs may transmit concurrent random access messages using the same time, frequency, and spatial resources, and the base station may decode the messages from the multiple UEs using joint decoding (e.g., successive interference cancellation (SIC) or multi-user decoding (MUD) techniques) to recover the corresponding random access messages.

A method of wireless communication by a UE is described. The method may include identifying random access channel resources for transmission of a random access message that includes a random access preamble and a random access payload, determining a time duration of a transmission gap to be provided between an ending time of the random access preamble and a starting time of the random access payload, the time duration of the transmission gap based on a configuration of the random access channel resources provided by a base station, and transmitting the random access message to the base station based on the determining.

An apparatus for wireless communication by a UE is described. The apparatus may include a processor, memory in electronic communication with the processor, and instructions stored in the memory. The instructions may be executable by the processor to cause the apparatus to identify random access channel resources for transmission of a random access message that includes a random access preamble and a random access payload, determine a time duration of a transmission gap to be provided between an ending time of the random access preamble and a starting time of the random access payload, the time duration of the transmission gap based on a configuration of the random access channel resources provided by a base station, and transmit the random access message to the base station based on the determining.

Another apparatus for wireless communication by a UE is described. The apparatus may include means for identifying random access channel resources for transmission of a random access message that includes a random access preamble and a random access payload, determining a time duration of a transmission gap to be provided between an ending time of the random access preamble and a starting time of the random access payload, the time duration of the transmission gap based on a configuration of the random access channel resources provided by a base station, and transmitting the random access message to the base station based on the determining.

A non-transitory computer-readable medium storing code for wireless communication by a UE is described. The code may include instructions executable by a processor to identify random access channel resources for transmission of a random access message that includes a random access preamble and a random access payload, determine a time duration of a transmission gap to be provided between an ending time of the random access preamble and a starting time of the random access payload, the time duration of the transmission gap based on a configuration of the random access channel resources provided by a base station, and transmit the random access message to the base station based on the determining.

In some examples of the method, apparatuses, and non-transitory computer-readable medium described herein, the determining the time duration of the transmission gap may include operations, features, means, or instructions for selecting an initial transmission gap duration based on the configuration of the random access channel resources, and adjusting the initial transmission gap duration based on a timing adjustment to obtain the time duration of the transmission gap. In some examples of the method, apparatuses, and non-transitory computer-readable medium described herein, the adjusting the initial transmission gap duration may include operations, features, means, or instructions for subtracting the timing adjustment from the initial transmission gap duration.

In some examples of the method, apparatuses, and non-transitory computer-readable medium described herein, the configuration of the random access channel resources is provided at least in part in one or more of a synchronization signal block (SSB), system information block (SIB), or a reference signal (RS) transmission from the base station.

In some examples of the method, apparatuses, and non-transitory computer-readable medium described herein, the random access preamble and the random access payload are transmitted without any adjustment based on a propagation delay of transmissions between the UE and the base station.

In some examples of the method, apparatuses, and non-transitory computer-readable medium described herein, the selecting the initial transmission gap duration may include operations, features, means, or instructions for identifying a guard time of the random access preamble based on a random access preamble length configuration, identifying an error vector measurement (EVM) window of the random access payload based on the configuration of the random access channel resources, and selecting the initial transmission gap duration from a set of available transmission gap durations based on the guard time and the EVM window.

In some examples of the method, apparatuses, and non-transitory computer-readable medium described herein, the random access message may be transmitted using shared radio frequency spectrum, and where the selecting the initial transmission gap duration may be further based on a channel occupancy time of the random access message and an outcome of a LBT procedure. In some examples of the method, apparatuses, and non-transitory computer-readable medium described herein, at least a subset of the set of available transmission gap durations may be based on the channel occupancy time of the random access message and an outcome of the LBT procedure.

In some examples of the method, apparatuses, and non-transitory computer-readable medium described herein, the set of available transmission gap durations include a set of transmission gap durations that may be mapped to different combinations of values of the guard time and the EVM window. In some examples of the method, apparatuses, and non-transitory computer-readable medium described herein, at least a subset of the set of available transmission gap durations may be based on a transient period time mask duration for switching a wireless transmitter at the UE between a power-on state and a power-off state. Some examples of the method, apparatuses, and non-transitory computer-readable medium described herein may further include operations, features, means, or instructions for estimating a propagation delay between the UE and the base station, and determining the timing adjustment based on the estimated propagation delay.

Some examples of the method, apparatuses, and non-transitory computer-readable medium described herein may further include operations, features, means, or instructions for adjusting one or more of a starting time of the random access preamble or the time duration of the transmission gap based on the estimated propagation delay. Some examples of the method, apparatuses, and non-transitory computer-readable medium described herein may further include operations, features, means, or instructions for determining whether to adjust the time duration of the transmission gap or both the time duration of the transmission gap and the starting time of the random access preamble based on one or more measurements of one or more downlink transmissions from the base station. In some examples of the method, apparatuses, and non-transitory computer-readable medium described herein, the starting time of the random access payload may be aligned with a starting time of a random access occasion time window at the base station.

Some examples of the method, apparatuses, and non-transitory computer-readable medium described herein may further include operations, features, means, or instructions for decoding one or more of a synchronization signal block (SSB), SIB, or a reference signal (RS) transmission from the base station, determining the configuration of the random access channel resources based on the decoding, estimating a propagation delay between the UE and the base station based on one or more of the SSB, SIB, or RS, determining the timing adjustment based on the propagation delay, generating the random access preamble and the random access payload for transmission in the random access message, inserting the transmission gap between the random access preamble and the random access payload, and applying the timing adjustment to one or more of the random access preamble or the random access payload.

In some examples of the method, apparatuses, and non-transitory computer-readable medium described herein, the random access message may be a first message of a two-step random access procedure, and where the method further may include operations, features, means, or instructions for receiving a second message of the two-step random access procedure from the base station responsive to transmitting the first message, and performing a connection establishment procedure with the base station based on the second message. In some examples of the method, apparatuses, and non-transitory computer-readable medium described herein, the random access preamble may be transmitted in a first transmission slot and the random access payload may be transmitted in a second transmission slot that may be different than the first transmission slot. In some examples of the method, apparatuses, and non-transitory computer-readable medium described herein, the random access preamble and the random access payload may have one or more of a different sub-carrier spacing (SCS), transmission power, transmission channel bandwidth, transmission and receiving beam configurations, fast Fourier transform (FFT) sampling rate, or any combinations thereof.

A method of wireless communication by a base station is described. The method may include transmitting a random access channel configuration to at least a first UE and a second UE, where the random access channel configuration provides random access channel resources for transmission of random access messages to the base station and information for a configurable transmission gap within the random access messages, monitoring the random access channel resources for one or more random access messages from at least the first UE and the second UE, and decoding at least a first random access message from the first UE and a second random access message from the second UE based on a time alignment of at least a portion of the first random access message and the second random access message that is provided by the configurable transmission gap.

An apparatus for wireless communication by a base station is described. The apparatus may include a processor, memory in electronic communication with the processor, and instructions stored in the memory. The instructions may be executable by the processor to cause the apparatus to transmit a random access channel configuration to at least a first UE and a second UE, where the random access channel configuration provides random access channel resources for transmission of random access messages to the base station and information for a configurable transmission gap within the random access messages, monitor the random access channel resources for one or more random access messages from at least the first UE and the second UE, and decode at least a first random access message from the first UE and a second random access message from the second UE based on a time alignment of at least a portion of the first random access message and the second random access message that is provided by the configurable transmission gap.

Another apparatus for wireless communication by a base station is described. The apparatus may include means for transmitting a random access channel configuration to at least a first UE and a second UE, where the random access channel configuration provides random access channel resources for transmission of random access messages to the base station and information for a configurable transmission gap within the random access messages, monitoring the random access channel resources for one or more random access messages from at least the first UE and the second UE, and decoding at least a first random access message from the first UE and a second random access message from the second UE based on a time alignment of at least a portion of the first random access message and the second random access message that is provided by the configurable transmission gap.

A non-transitory computer-readable medium storing code for wireless communication by a base station is described. The code may include instructions executable by a processor to transmit a random access channel configuration to at least a first UE and a second UE, where the random access channel configuration provides random access channel resources for transmission of random access messages to the base station and information for a configurable transmission gap within the random access messages, monitor the random access channel resources for one or more random access messages from at least the first UE and the second UE, and decode at least a first random access message from the first UE and a second random access message from the second UE based on a time alignment of at least a portion of the first random access message and the second random access message that is provided by the configurable transmission gap.

In some examples of the method, apparatuses, and non-transitory computer-readable medium described herein, each random access message includes a random access preamble and a random access payload, and where the configurable transmission gap may be inserted between the random access preamble and the random access payload. In some examples of the method, apparatuses, and non-transitory computer-readable medium described herein, the configurable transmission gap provides that the random access payload of each of the first random access message and the second random access message may be time-aligned with a starting time of a random access channel occasion for the random access payloads.

In some examples of the method, apparatuses, and non-transitory computer-readable medium described herein, the decoding may include operations, features, means, or instructions for demultiplexing superimposed random access preambles and superimposed random access payloads from each of the first UE and the second UE, and performing a joint detection procedure to decode the superimposed random access preambles and superimposed random access payloads of each of the first UE and the second UE. In some examples of the method, apparatuses, and non-transitory computer-readable medium described herein, the joint detection procedure includes one or more of multi-user decoding (MUD) or successive interference cancellation (SIC) to decode the superimposed random access preambles and superimposed random access payloads of each of the first UE and the second UE.

In some examples of the method, apparatuses, and non-transitory computer-readable medium described herein, the configurable transmission gap may be based on an initial transmission gap duration associated with the random access channel configuration and a timing adjustment applied to the initial transmission gap duration by each UE. In some examples of the method, apparatuses, and non-transitory computer-readable medium described herein, the timing adjustment may be based on a propagation delay between the base station and each UE. In some examples of the method, apparatuses, and non-transitory computer-readable medium described herein, the initial transmission gap duration may be indicated by the random access channel configuration.

In some examples of the method, apparatuses, and non-transitory computer-readable medium described herein, the random access channel configuration indicates one or more of a guard time of a random access preamble, an error vector measurement (EVM) window of a random access payload, a transient period time mask duration for switching a wireless transmitter at each UE between a power-on state and a power-off state, or any combinations thereof. In some examples of the method, apparatuses, and non-transitory computer-readable medium described herein, the initial transmission gap duration may be indicated based on a set of available transmission gap durations that may be mapped to different combinations of values of the guard time, the EVM window, the transient period time mask duration, or any combinations thereof.

In some examples of the method, apparatuses, and non-transitory computer-readable medium described herein, the time alignment of at least the portion of the first random access message and the second random access message provides that at least the portion of the first random access message and the second random access message may be aligned in time, frequency, and spatial resources and allows decoding of multiple random access messages at a single random access channel occasion at the base station. In some examples of the method, apparatuses, and non-transitory computer-readable medium described herein, each of the first random access message and the second random access message may be an original transmission of an initial random access message of a two-step random access procedure, or a re-transmission of the initial random access message of the two-step random access procedure, and where the method further may include operations, features, means, or instructions for transmitting a final random access message of the two-step random access procedure to each of the first UE and the second UE, and performing a connection establishment procedure with the first UE and the second UE based on the final random access message transmitted to the first UE and the second UE.

DETAILED DESCRIPTION

Figure 1:
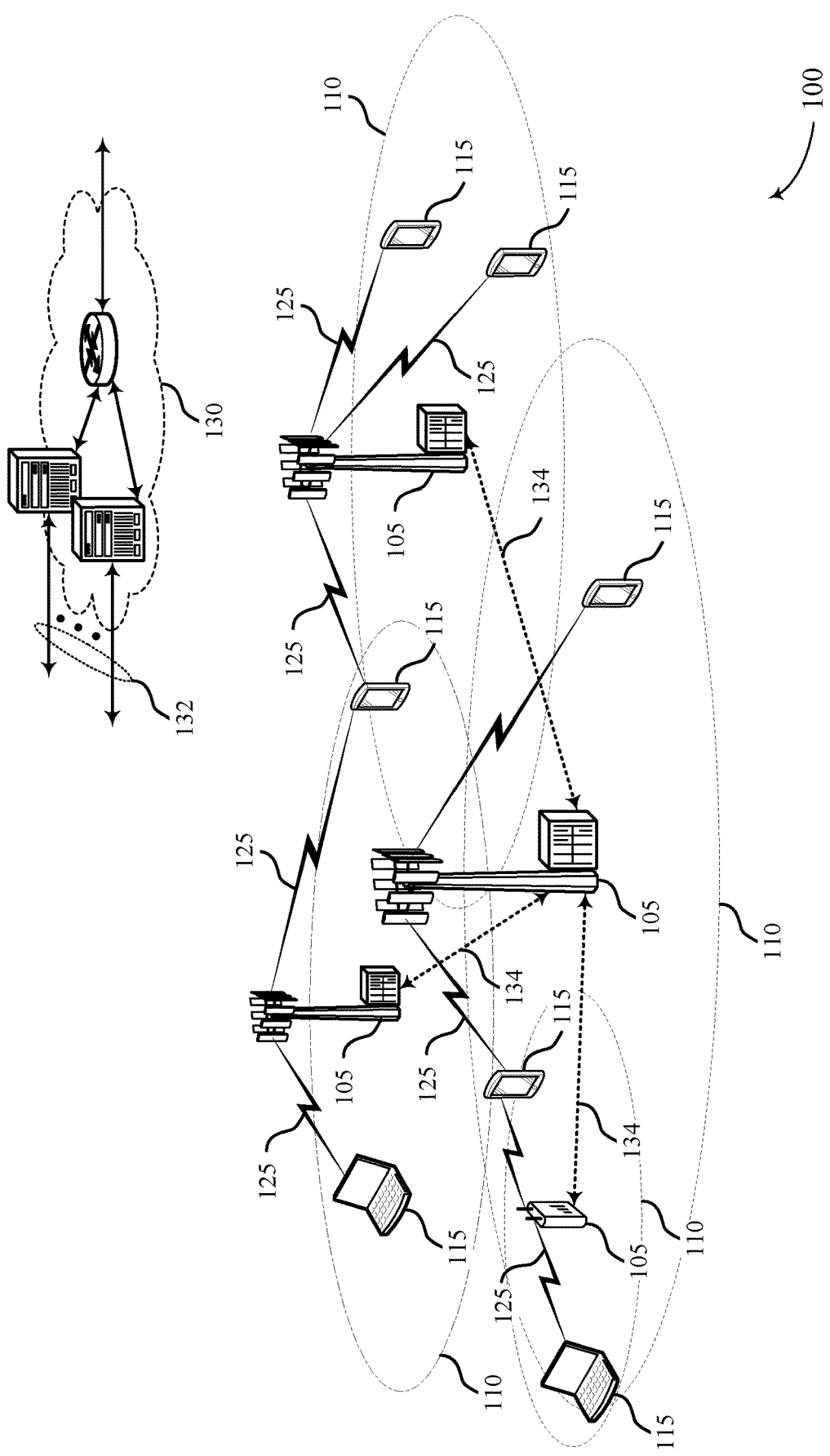
FIG. 1 illustrates an example of a system for wireless communications that supports transmission gap configuration for random access messages in accordance with aspects of the present disclosure.

The present disclosure describes techniques for transmission gap determination for a random access message transmitted by a user equipment (UE) in a two-step random access procedure. The UE may perform the random access procedure (e.g., a random access channel (RACH) procedure) with a base station, for example, when initially accessing a wireless network, during a handover, when re-establishing a connection, to perform a synchronization procedure, or any combinations thereof. The random access message of the two-step random access procedure may include a random access preamble and a random access payload. The transmission gap, in various aspects of the disclosure, may be inserted between an end time of the random access preamble and a start time of the random access payload.

In some cases, the transmission gap may be provided when one or more transmission parameters of the random access preamble and the random access payload are different, and may allow the UE to properly adjust or configure transmission components for the different transmission parameters. Such transmission parameters that may be different between the random access preamble and the random access payload may include, for example, different numerology (e.g., due to different subcarrier spacing (SCS)), different transmission bandwidths, different transmission beams, different transmission power, different sampling rates, different transmission and/or receiving beam configurations, or different timing advance (TA) values. Further, in cases where the base station and UE use shared or unlicensed radio frequency spectrum, a listen-before-talk (LBT) procedure may be performed prior to transmitting the preamble or payload, which may necessitate a transmission gap. In some cases, a UE may determine a time duration of the transmission gap based on a random access configuration (e.g., that provides preamble length and uplink resources for random access messages), a timing adjustment for uplink transmissions (e.g., based on an estimated propagation delay), or any combinations thereof. In some cases, a base station may receive random access messages from multiple UEs in RACH occasions (ROs) and may jointly decode the multiple random access messages based on the transmission gap providing random access messages that are aligned within RO boundaries.

In some cases, the UE may acquire random access configuration information for a random access procedure from one or more broadcast transmissions of the base station. For example, the UE may receive a synchronization signal block (SSB) that may provide synchronization signals (e.g., a primary synchronization signal (PSS) and a secondary synchronization signal (SSS)) and a physical broadcast (PBCH) transmission that identifies a control resource set (CORESET) to be monitored to identify resources that contain remaining minimum system information (RMSI). In some cases, the UE may receive one or more system information blocks (SIBS) from the base station, one or more reference signals (RSs) (e.g., a cell-specific reference signal (CRS)) from the base station, or combinations thereof, that may be used to identify the random access configuration. Such SSB, SIB, and RS transmissions may be used to identify random access resources, whether a two-step random access procedure is enabled, a preamble length for the random access preamble, transmission parameters for the random access preamble and random access payload, other configuration parameters, or any combinations thereof.

Based on the configuration information, the UE may send a first random access message (e.g., a MsgA of a two-step random access procedure), which may include the random access preamble and the random access payload. In some cases, the UE may transmit communications to the base station using a timing adjustment which may account for estimated propagation delays in transmissions sent to the base station. Upon receiving the first random access message from the UE, the base station may determine an accurate timing advance (TA) based on the contents of the first random access message and may prepare a second random access message (e.g., a MsgB of the two-step random access procedure) to send to the UE in order to complete the random access procedure. In some cases, the base station may send a downlink control message (e.g., physical downlink control channel (PDCCH) message) corresponding to the second random access message, which may include information necessary to process the second random access message. Further, in some cases the base station may include the determined TA in the contents of the downlink control message, such that the UE may obtain additional timing information from the downlink control message.

After successfully performing the random access procedure, the UE and the base station may establish a data connection to communicate subsequent transmissions of data and other communications. That is, the UE and the base station may establish a radio resource control (RRC) configuration for the data connection, and the base station may allocate resources (e.g., time, frequency, and/or spatial resources) for uplink control transmissions such as scheduling requests. After the random access procedure, the UE may be in a connected state with the base station.

A UE using techniques in accordance with various aspects of the present disclosure may thus transmit messages in a two-step random access procedure using timing that may be coordinated with one or more RO windows at a base station. The base station may efficiently receive the random access messages and complete the two-step random access procedure and send a response message to the UE. Such two-step random access procedures provide enhanced efficiency and reduced overhead relative to a four-step random access procedure that may be used in some cases. Further, techniques as discussed herein may allow for efficient determination of the transmission gap when different transmission parameters are used for a preamble and payload transmission, to provide such transmissions within a RO window according to a random access configuration. Additionally, a base station operating in accordance with various aspects of the disclosure may jointly decode multiple concurrent transmissions with reduced complexity relative to cases where different UEs may transmit random access messages at different times.

Aspects of the disclosure are initially described in the context of a wireless communications system. Aspects of the disclosure are further illustrated by and described with reference to random access message formats and timing examples. Aspects of the disclosure are further illustrated by and described with reference to apparatus diagrams, system diagrams, and flowcharts that relate to transmission gap configuration for random access messages.

FIG. 1 illustrates an example of a wireless communications system 100 that supports transmission gap configuration for random access messages in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize one or more carriers that have a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing such carriers may transmit wideband signals (e.g., according to frequency channel or carrier bandwidths of 20, 40, 60, 80 MHz, etc.) at reduced symbol durations (e.g., 16.67 microseconds). A TTI in such cases may include one or multiple symbol periods. In some cases, the TTI duration (that is, the number of symbol periods in a TTI) may be variable.

In some cases, UEs 115 and base stations 105 may implement a two-step random access procedure, and a UE 115 may transmit to a base station 105 a single initial random access message. In some cases, the single random access message may include a random access preamble and a random access payload, which may be transmitted in non-contiguous resources. In response to the initial random access message, the base station 105 may transmit to the UE 115 a single response message. In some cases, the random access payload may have one or more transmission parameters that are different than transmission parameters of the random access preamble, which may result in a transmission gap between the preamble and payload transmissions. In some cases, the UE 115 may be configured to determine a time duration of the transmission gap based at least in part on a configuration of the random access channel resources, a timing adjustment for uplink transmissions from the UE 115 to the base station 105, or any combinations thereof.

In some cases, the UE 115 may select an initial transmission gap duration based at least in part on the configuration of the random access channel resources, and may adjust the initial transmission gap duration based at least in part on the timing adjustment (e.g., based on an estimated propagation delay between the UE 115 and the base station 105) to obtain the time duration of the transmission gap. In some cases, the initial transmission gap duration may be determined based on a guard time of the random access preamble, an EVM window of the random access payload, a transient period time mask duration, a channel occupancy time of the random access message, an outcome of a LBT procedure, or any combinations thereof. In some cases, the initial transmission gap duration may be selected from a set of available transmission gap durations (e.g., from a preconfigured table of initial transmission gap durations that are mapped to different combinations of values of parameters).

In some cases, one or more base stations 105 may configure multiple UEs 115 with random access channel resources, and may monitor RO windows for transmissions of one or more UEs 115. In some cases, multiple UEs 115 may transmit concurrent random access messages using the same time, frequency, and spatial resources, and the base station 105 may decode the messages from the multiple UEs 115 using joint decoding (e.g., successive interference cancellation (SIC) or multi-user decoding (MUD) techniques) to recover the corresponding random access messages.

Figure 2:
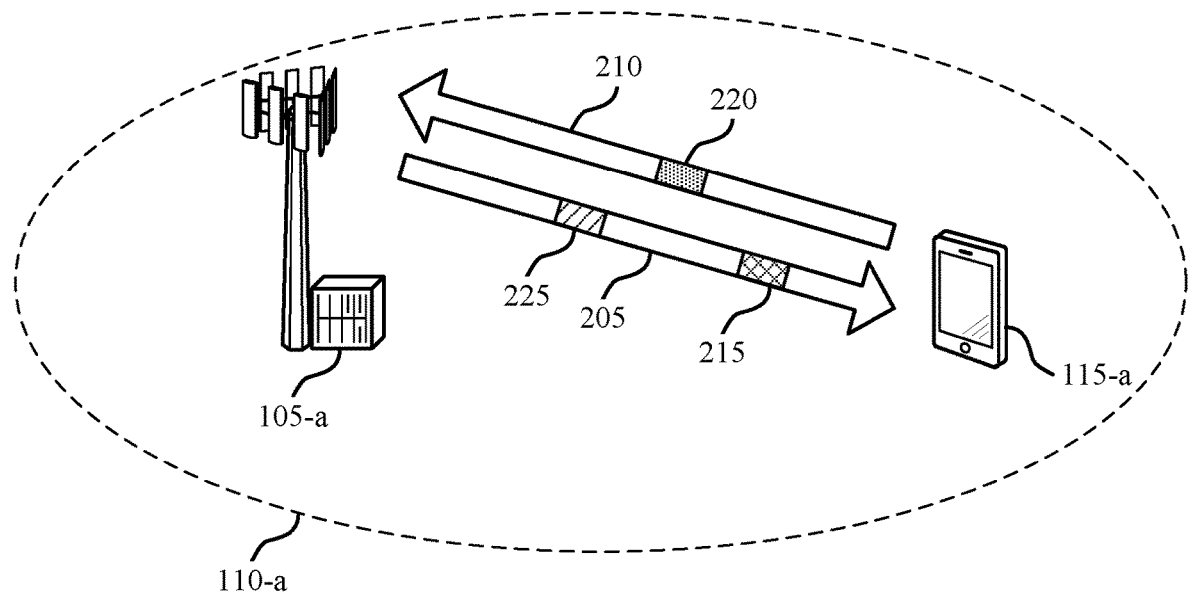
FIG. 2 illustrates an example of a portion of a wireless communications system that supports transmission gap configuration for random access messages in accordance with aspects of the present disclosure.

FIG. 2 illustrates an example of a wireless communications system 200 that supports transmission gap configuration for random access messages in accordance with aspects of the present disclosure. In some examples, wireless communications system 200 may implement aspects of wireless communications system 100. The wireless communications system 200 includes a base station 105-a and a UE 115-a, which may be examples of the corresponding devices as described with reference to FIG. 1.

In some cases, the UE 115-a may perform a connection procedure (e.g., a random access procedure such as a RACH procedure) to establish a connection with the base station 105-a. For example, the UE 115-a may perform a random access procedure, such as a two-step and/or a four-step random access procedure (e.g., a two-step RACH procedure and/or a four-step RACH procedure), to establish a connection to be used to communicate using uplink transmissions 210 and downlink transmissions 205. In some cases, the base station 105-a may transmit configuration information 215 that may be received by the UE 115-a, and other UEs, that may provide configuration information for random access procedures available at the base station 105-a, one or more parameters associated with the random access procedures (e.g., a preamble length, transmission power, etc.), wireless resources for random access message transmissions (e.g., time, frequency, and/or spatial resources, RO windows, etc.).

The UE 115-a may determine, based on the configuration information 215, to perform a two-step random access procedure, and may transmit an initial random access message 220 to the base station 105-a. The initial random access message 220, which may be a MsgA transmission of a two-step RACH procedure, may include a random access preamble and a random access payload. In some cases, a transmission gap may be inserted between the random access preamble and the random access payload in accordance with various techniques as discussed herein. The base station 105-a may receive the initial random access message 220 and perform processing on the message to determine a random access response 225, which may be a MsgB transmission of a two-step RACH procedure, that may be transmitted to the UE 115-a to complete the random access procedure.

In other cases, the UE 115-a and base station 105-a may perform a four-step random access procedure. In a four-step random access procedure, the UE 115-a may transmit to the base station 105-a a first message (e.g., a random access preamble, in some cases referred to as "Msg1"). In response, the base station 105-a may transmit to the UE 115-a second message (e.g., a random access response message, in some cases referred to as "Msg2"). The second message may include a grant of uplink resources for the UE 115-a to transmit to the base station 105-a a third message (e.g., an RRC message, in some cases referred to as a "Msg3") requesting a new or reconfigured connection with the base station 105-a. The four-step random access procedure may include the base station 105-a transmitting to the UE 115-a a fourth message (e.g., a contention resolution message or connection complete message, in some cases referred to as a "Msg4"), or other downlink signaling, such as an RRC message, to confirm the requested new or reconfigured connection.

After successfully performing the random access procedure, the UE 115-a and the base station 105-a may establish a data connection to communicate subsequent transmissions of data and other communications. That is, the UE 115-a and the base station 105-a may establish an RRC configuration (e.g., context) for the data connection, and the base station 105-a may allocate resources (e.g., PUCCH resources) for uplink control transmissions such as scheduling requests, channel state information (CSI) reporting, or acknowledgements. After the random access procedure, the UE 115-a may be in a connected state (e.g., RRC connected state) with the base station 105-a.

According to various aspects, the UE 115-a may use the two-step random access procedure when an amount of data to be transferred is below a threshold amount of data, or where a persistent data connection may not be desired. As compared to the four messages of a four-step random access procedure, for example, the random access message 220 of the two-step random access procedure may combine all or a portion of the Msg1 and the Msg3 of a four-step random access procedure. The UE 115-a may transmit the random access message 220 to the base station 105-a, for example, on a physical random access channel (PRACH), a PUSCH, or using other configured resources. In some cases, the UE 115-a may transmit the preamble and the data payload using different numerologies (i.e., different transmission waveform characteristics, such as subcarrier spacing, cyclic prefix size, etc.), different sets of transmission resources (e.g., time, frequency, and/or spatial resources), different portions of a carrier, different bandwidth parts, using different power control schemes (e.g., using different transmit powers), and/or different sampling rates, and/or different beam configurations for UE transmitting and base station receiving. Such different transmission parameters may necessitate a transmission gap between the preamble and payload during which the UE 115-a can configure circuitry for the different transmissions.

The preamble (in some cases referred to a RACH preamble, or PRACH preamble) may be a sequence from a group of predefined sequences. The preamble may indicate to the base station 105-a the presence of a random access attempt and allow the base station 105-a to determine a delay (such as a timing delay) between the base station 105-a and the UE 115-a. The preamble of the random access message 220 may, in some cases, be defined by a preamble sequence and a cyclic prefix. A preamble sequence may be defined based in part on a Zadoff-Chu sequence. The UE 115-a may, in some cases, use a guard period to handle timing uncertainty of the random access message 220 transmission. For example, before beginning the random access procedure, the UE 115-a may obtain downlink synchronization with the base station 105-a based in part on a cell-search procedure. However, because the UE 115-a has not yet obtained uplink synchronization with the base station 105-a, there may be an uncertainty in uplink timing due to the location of the UE 115-a in the cell (such as geographic coverage area of base station 105-a) not being known. In some cases, the uncertainty in uplink timing may be based in part on a dimension (e.g., size and/or area) of the cell.

A number of preamble sequences (e.g., 64 preamble sequences) may be defined for a cell. The UE 115-a may select a preamble sequence from a set of sequences in a cell (e.g., geographic coverage area 230 of the base station 105-a). The UE 115-a may identify the plurality of preamble sequences from system information (SI), for example, broadcasted by the base station 105-a in a SIB, from which the UE 115-a may select (e.g., randomly) the particular preamble sequence to transmit. The UE 115-a may further transmit the data payload in the random access message 220 that may indicate an amount of uplink data intended for the communication to the base station 105-a. In some cases, the UE 115-a may also transmit with the payload one or more reference signals, for example, to be used for demodulation (e.g., a demodulation reference signal (DMRS)), or other like purposes. In some cases, the UE 115-a may select the preamble sequence for the preamble based on an amount of data that the UE 115-a is to transmit in the payload. In some cases (e.g., if the UE 115-a indicates that the UE 115-a has additional data to transmit that is not included in the payload), the base station may determine an allocation of resources (e.g., time, frequency, and/or spatial resources) to be granted to the UE 115-a.

In some cases, the UE 115-a and the base station 105-a may operate in a shared or unlicensed radio frequency spectrum bandwidth. In some such cases, before establishing and initiating communications, the UE 115-a and/or the base station 105-a may utilize a channel access procedure to determine whether the time and frequency resources for the channel are available, which may prevent interference and collisions with communications between another UE 115 and the base station 105-a, another UE 115 and another base station 105, higher priority transmissions (e.g., radar), and the like. For example, before one or more (e.g., each) of the messages of the random access procedure, the UE 115-a and/or the base station 105-a may perform an opportunistic contention-based channel access procedure (e.g., a LBT procedure, such as a CAT4, CAT2, or CAT1 LBT procedure, etc.) to contend for access to the transmission medium or channel. In some cases, the UE 115-a may perform a directional LBT procedure in multiple transmission direction, for example, for communications systems using directional communications (e.g., mmW communications systems).

For example, before transmitting the preamble of the random access message 220, the UE 115-a may perform an LBT procedure to ascertain that a set of resources is available for transmission (e.g., a set of time, frequency, and/or spatial resources). If the LBT procedure is successful, the UE 115-a may transmit the preamble of the random access message 220 to the base station 105-a. However, as described above, the UE 115-a may transmit the preamble and the payload using different numerologies, different portions of a carrier, different bandwidth parts, using different power control schemes and/or different sampling rates, and/or different transmitting/receiving beam configurations. In such cases, the set of resources for which the UE 115-a performed the LBT procedure may be a different set of resources than the set of resources with which the UE 115-a is to transmit the payload. Additionally, the set of resources used to transmit the preamble may be associated with a different numerology (e.g., a different subcarrier spacing) than the set of resources used to transmit the payload. Thus, after transmitting the preamble, the UE 115-a may perform a second LBT procedure during the transmission gap to ascertain that the set of resources for transmitting the payload portion of the random access message 220 is available for transmission. Similarly, if the base station 105-a successfully receives the random access message 220, the base station 105-a may also perform an LBT procedure for transmitting to the UE 115-a the random access response 225 of the two-step random access procedure.

In some cases, the UE 115-a may transmit multiple repetitions of the random access message and monitor for responses after transmitting the repetitions or after each repetition (including, e.g., using HARQ for the repetitions). In some cases, the UE 115-a may incrementally increase a transmit power and/or transmit the preamble using a new preamble sequence for a number of attempts (e.g., until reaching a configured number of attempts), and may in some instances fall back to a traditional four-step random access procedure following the number of attempts.

In some cases, the UE 115-a may be configured to determine a time duration of the transmission gap in accordance with techniques as discussed herein. For example, the UE 115-a may determine the time duration of the transmission gap based at least in part on a configuration of the random access channel resources, a timing adjustment for uplink transmissions from the UE 115-a to the base station 105-a, or any combinations thereof. In some cases, the UE 115-a may select an initial transmission gap duration based at least in part on the configuration of the random access channel resources, and may adjust the initial transmission gap duration based at least in part on the timing adjustment (e.g., based on an estimated propagation delay between the UE 115-a and the base station 105-a) to obtain the time duration of the transmission gap. In some cases, the initial transmission gap duration may be determined based on a guard time of the random access preamble, an EVM window of the random access payload, a transient period time mask duration, a channel occupancy time of the random access message, an outcome of a LBT procedure, or any combinations thereof. In some cases, the initial transmission gap duration may be selected from a set of available transmission gap durations (e.g., from a preconfigured table of initial transmission gap durations that are mapped to different combinations of values of parameters).

Figure 3:
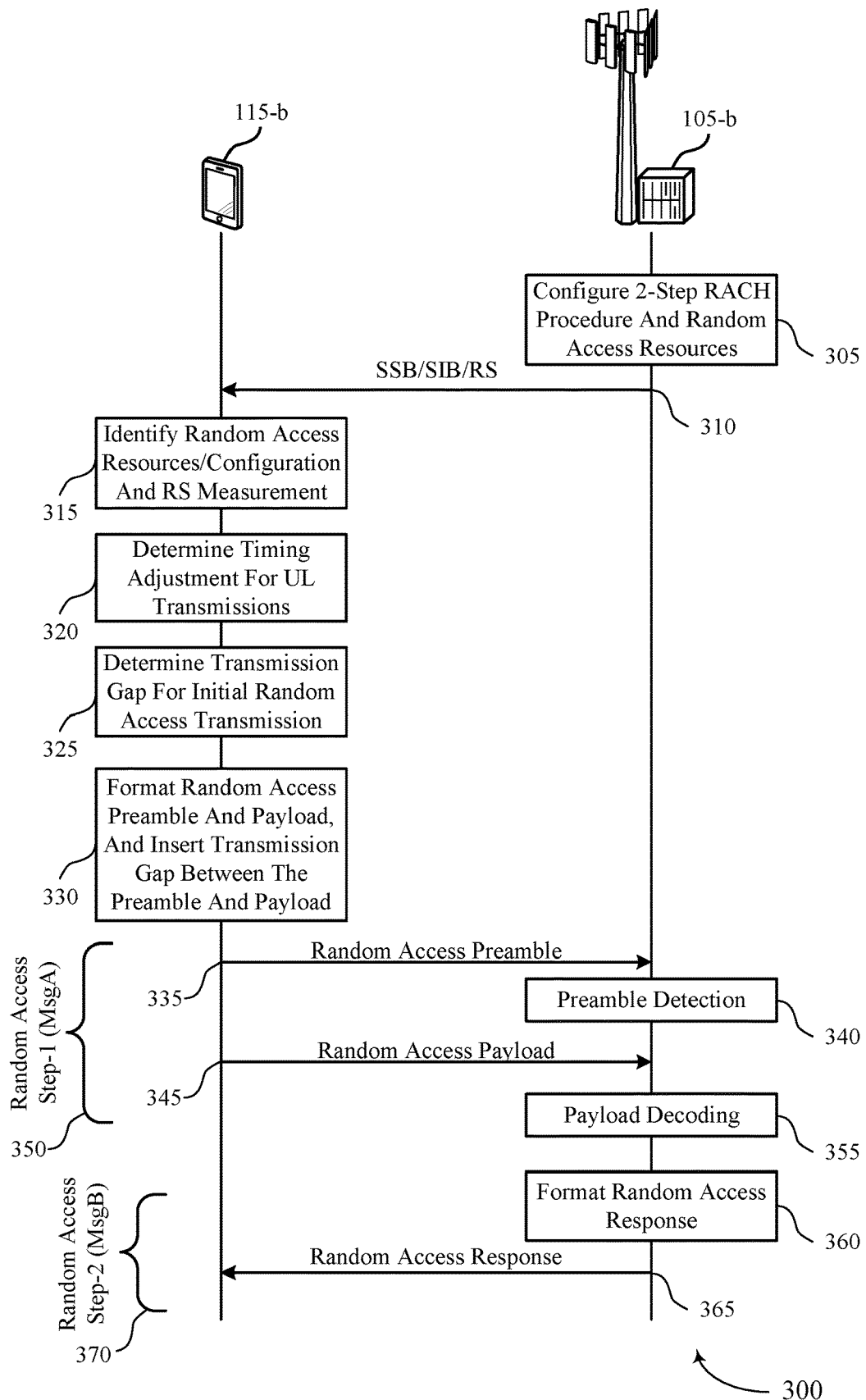
FIG. 3 illustrates an example of a process flow that supports transmission gap configuration for random access messages in accordance with aspects of the present disclosure.

FIG. 3 illustrates an example of a process flow 300 that supports transmission gap configuration for random access messages in accordance with aspects of the present disclosure. In some examples, process flow 300 may implement aspects of wireless communications system 100 or 200. Further, process flow 300 may be implemented by a UE 115-b and a base station 105-b, which may be examples of a UE 115 and a base station 105 described with reference to FIGS. 1-2.

In the following description of the process flow 300, the operations between UE 115-b and base station 105-b may be transmitted in a different order than the order shown, or the operations performed by base station 105-b and UE 115-b may be performed in different orders or at different times. Certain operations may also be left out of the process flow 300, or other operations may be added to the process flow 300. It is to be understood that while base station 105-b and UE 115-b are shown performing a number of the operations of process flow 300, any wireless device may perform the operations shown.

At 305, base station 105-b may configure a two-step random access procedure and configure random access resources for random access procedures. In some cases, the base station 105-b may configure both a two-step random access procedure and a traditional four-step random access procedure, with different random access resources provided for the different procedures. In some cases, random access resources may be configured based on a preamble length, transmission channel characteristics, channel bandwidth, numerology for the preamble, payload, or both, one or more other factors, or any combinations thereof.

At 310, the base station 105-*b* may transmit one or more broadcast signals to one or more UEs 115, which may include UE 115-*b*, via one or more SSB transmissions, SIB transmissions (e.g., provided in system information in RMSI), reference signal (RS) transmissions (e.g., a CRS), or any combinations thereof. The configuration information for two-step random access procedure, in some cases, may be provided in a SIB.

At 315, the UE 115-*b* may identify the random access resources and random access configuration, and may perform one or more RS measurements. In some cases, the UE 115-*b* may monitor for one or more SSB transmissions and, upon detection of the SSB, measure one or more RS (e.g., PSS/SSS) of the SSB. The UE 115-*b* may also identify, in some cases, a CORESET that may identify RMSI resources. The UE 115-*b* may receive the SIB via the RMSI resources, and identify that the two-step random access procedure is configured and determine to generate an initial random access message (e.g., a MsgA). In some cases, the UE 115-*b* may also measure one or more RSs (e.g., a CRS).

At 320, the UE 115-*b* may determine timing adjustments for uplink transmissions. In some cases, the timing adjustments may be determined based on an estimated propagation delay between the UE 115-*b* and the base station 105-*a*. Such an estimated propagation delay may be determined based on the one or more RS measurements made at the UE 115-*b* (e.g., based on PSS/SSS/CRS, etc.).

At 325, the UE 115-*b* may determine the transmission gap for the initial random access transmission (e.g., for the MsgA transmission). The transmission gap, as discussed herein, may be inserted between a random access preamble and a random access payload of the initial random access message. The UE 115-*b* may determine a time duration of the transmission gap based on one or more configuration parameters of the random access procedure that is configured by the base station 105-*b*. Such parameters may include, for example, a guard time of the random access preamble, an EVM window of the random access payload, a transient period time mask duration, a channel occupancy time of the random access message, an outcome of a LBT procedure, or any combinations thereof. In some cases, the UE 115-*b* may adjust an initial time duration of the transmission gap based on the determined timing adjustment.

At 330, the UE 115-*b* may format the random access preamble and random access payload, and insert the transmission gap between the random access preamble and random access payload, in accordance with various techniques discussed herein. In some cases, the UE 115-*b* may select the random access preamble based on the two-step random access procedure and a subset of preambles that may be configured for the two-step random access procedure. In some cases, the preamble length may be identified based on the random access configuration information (e.g., whether the preamble is a long-sequence based preamble or short-sequence based preamble). The payload may include, for example, uplink control information such as a RRC connection request and identification information of the UE 115-*a*.

At 335, UE 115-*b* may transmit the random access preamble to the base station 105-*b*. The random access preamble may be transmitted as a first portion of the random access request message (MsgA) in a first step of a two-step RACH procedure, as indicated at 350. The random access preamble may be transmitted by the UE 115-*b* in a RO window that is configured by the base station 105-*b*. In some cases, the random access preamble may be transmitted in a RO window that is associated with a particular SSB transmission beam when the UE 115-*b* and base station 105-*d* use beamformed communications.

At 340, the base station 105-*b* may perform a preamble detection procedure and identify the random access preamble of the UE 115-*b*. In some cases, the base station 105-*b* may perform a joint detection procedure in which multiple random access preambles from multiple UEs may be detected using joint preamble detection techniques (e.g., SIC).

At 345, the UE 115-*b* may transmit the random access payload to the base station 105-*b*. The random access payload may be transmitted following the transmission gap after the random access preamble transmission. In some cases, during the transmission gap, the UE 115-*b* may reconfigure transmit hardware based on transmission parameters of the random access payload that are different from the random access preamble. In some cases, the UE 115-*b* may perform a LBT procedure during the transmission gap. The random access payload may be transmitted during a RO window configured by the base station 105-*b*, and the transmission gap may provide that the random access payload transmission is aligned with a boundary of the RO window, which may provide reduced processing complexity at the base station 105-*b*.

At 355, the base station 105-*b* may perform payload decoding. In some cases, the base station 105-*b* may decode the random access payload of the UE 115-*b* and identify the uplink control information provided by the UE 115-*b*. In some cases, the payload may include a DMRS, which may be used by the base station 105-*b* to assist in the demodulation and decoding of the payload. In some cases, the base station 105-*b* may perform joint decoding of multiple concurrent payload transmissions from multiple UEs (e.g., using SIC or MUD techniques). In some cases, the alignment of the random access payloads of multiple UEs in a RO window may allow for joint decoding to be performed starting at a boundary of the associated RO window, which may provide reduced processing complexity at the base station 105-*b* relative to cases were different UEs may transmit at different times within the RO window (e.g., which would require additional buffering of received signals and multiple decoding hypotheses).

At 360, the base station 105-*b* may format a random access response. The random access response (e.g., a MsgB) may be determined based on the payload received from the UE 115-*b* in accordance with a second step of the two-step random access procedure, as indicated at 370. At 365, the base station 105-*b* may transmit the random access response to the UE 115-*b*. Following the random access response, the base station 105-*b* and UE 115-*b* may, for example, initiate a RRC connection establishment procedure, a RRC re-establishment procedure, a handover procedure, a timing synchronization procedure, or any combinations thereof.

Figure 4:
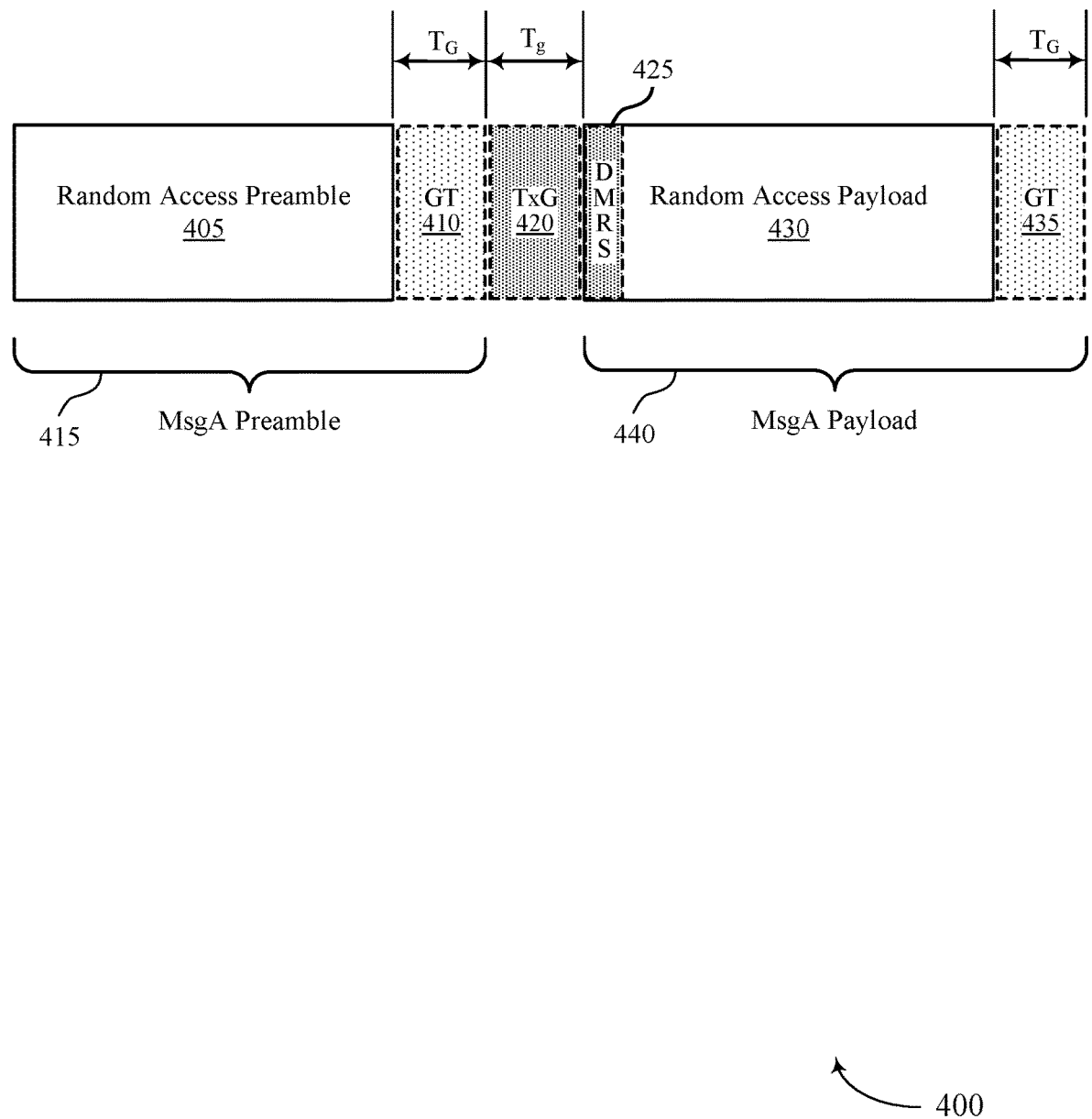
FIG. 4 illustrates an example of a random access message and transmission gap in accordance with aspects of the present disclosure.

FIG. 4 illustrates an example of a random access message 400 that supports transmission gap configuration for random access messages in accordance with aspects of the present disclosure. In some examples, random access message 400 may implement aspects of wireless communications system 100 or 200. Additionally, random access message 400 may be used in conjunction with process flow 300 of FIG. 3. In this example, the random access message 400 may be an initial random access message of a two-step random access procedure (e.g., MsgA of a 2-step RACH procedure).

The random access message 400 in this example, includes a random access preamble 405 and a guard time 410 ($T_G$), which may form MsgA preamble 415. The random access message 400 also includes a transmission gap 420 ($T_g$), and random access payload 430. In this example, a DMRS 425 may be included with random access payload 430. In this example, a guard time 435 may also be provided following the random access payload 430. The DMRS 425, random access payload 430, and guard time 435, may form MsgA payload 440 of the two-step random access procedure.

As discussed above, the inclusion of the transmission gap 420 may allow for retuning of transmit circuitry at a transmitting UE, performance of a LBT procedure, or any combinations thereof. In some cases, the transmission gap 420 may be used when a TA is unknown or out of date, when a different numerology is used for the random access preamble 405 and the random access payload 430, when a different bandwidth is used for the random access preamble 405 and the random access payload 430, when a different transmission beam is used for the random access preamble 405 and the random access payload 430, when different power control schemes are used for the random access preamble 405 and the random access payload 430, when a different sampling rate is used for the random access preamble 405 and the random access payload 430, when a different transmitting and/or receiving beam is used for the random access preamble 405 and the random access payload 430, or any combinations thereof. Further, in some cases, when the guard time 410 is non-zero, the transmission gap 420 may be reduced. As used herein the term "transmission gap" may be used to generally refer to the time gap between the random access preamble 405 and the random access payload 430, which may include guard time 410.

The guard time 410, and guard time 435, may allow for completion of a transmission with sufficient time to avoid interference with a subsequent transmission when timing synchronization may not be established. In some cases, the duration of the guard time 410 may be dependent upon a preamble length, preamble format, or any combinations thereof. For example, if the base station configures long-sequence based preambles (e.g., for LTE reframing, large cells, coverage enhancement, high speed deployments, etc.), the duration of the guard time 410 may be provided that is relatively long compared to guard times provided for short-sequence based preambles. Further, in some cases (e.g., preamble format A of short-sequence based preambles), the guard time 410 may be zero. In some cases, one or more tables may be configured that provide guard times based on different preamble lengths, preamble formats, SCS, bandwidth, cyclic prefix length, number of sequences that may be concatenated, and the like.

In cases, where the guard time 410 of the random access preamble 405 is non-zero, the transmission gap 420 may be reduced, subject to a constraint on a minimum transition period between transmitter on and off states, referred to as a transient period time mask duration as discussed herein. Further, the guard time 410 may be effectively shortened in some cases based on a timing adjustment applied to the random access payload 430.

Figure 5:
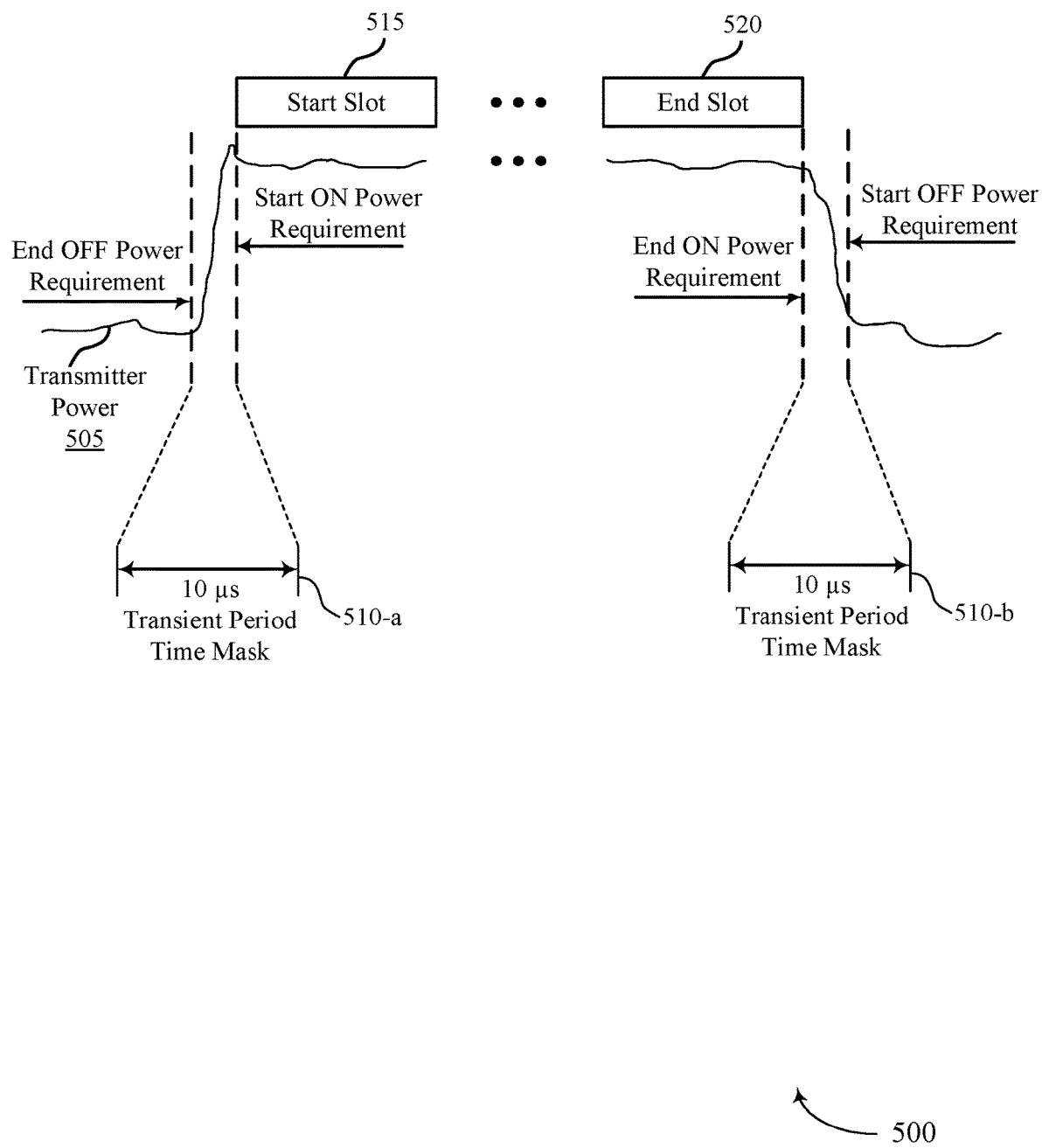
FIG. 5 illustrates an example of a transient period time mask that supports transmission gap configuration for random access messages in accordance with aspects of the present disclosure.

FIG. 5 illustrates an example of a transient period time mask 500 that supports transmission gap configuration for random access messages in accordance with aspects of the present disclosure. In some examples, transient period time mask 500 may be implemented in aspects of wireless communications system 100 or 200.

As discussed with respect to FIG. 4, the transmission gap between a random access preamble and payload may be shortened up to a constraint on a minimum transition period between transmitter on and off states. In this example, transmitter power 505 is indicated in relation to a slot start 515 and a slot end 520, where the transmitter is off prior to slot start 515 and after slot end 520. In order to allow for the transmitter to switch between an OFF state and ON state, and vice-versa, a transient period time mask 510 may be provided. In this example, a 10 μs mask is provided between an end of an OFF power requirement and the start of an ON power requirement, and also between and end of the ON power requirement and start of the OFF power requirement. Such transient period time mask 510 may also be used in cases where transmission powers change, when transmission bandwidths change, for RB hopping, and the like. In cases of RB hopping, the transition period may be shared symmetrically between RBs.

Figure 6:
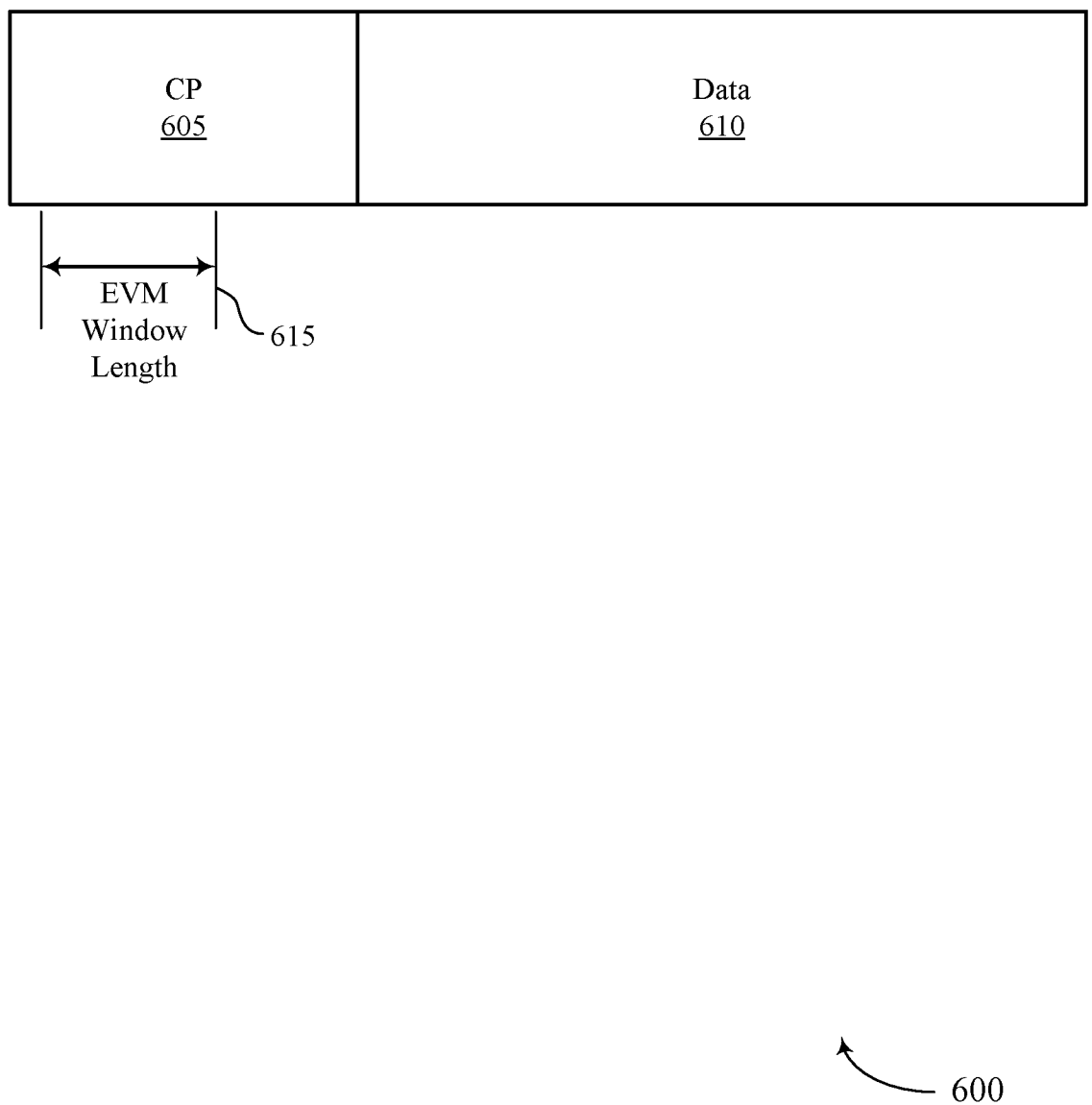
FIG. 6 illustrates an example of an error vector magnitude (EVM) window that supports transmission gap configuration for random access messages in accordance with aspects of the present disclosure.

FIG. 6 illustrates an example of an error vector magnitude (EVM) window 600 that supports transmission gap configuration for random access messages in accordance with aspects of the present disclosure. In some examples, error vector magnitude (EVM) window 600 may be implemented in aspects of wireless communications system 100 or 200. As indicated above, the duration of a transmission gap between a random access preamble and payload may also be dependent on an EVM window, in some cases. An example EVM window 600 may be provided based on a cyclic prefix 605 and data 610 that may be transmitted by a UE. An EVM window length 615 may be provided that spans a portion of the cyclic prefix 605 duration (e.g., 50% of the CP duration), and may allow for measurement of error of constellation points of a transmission. In some cases, the EVM window length 615 may be identified based on a configured table based on channel bandwidth, FFT size, CP length, SCS, or any combinations thereof.

Figure 7:
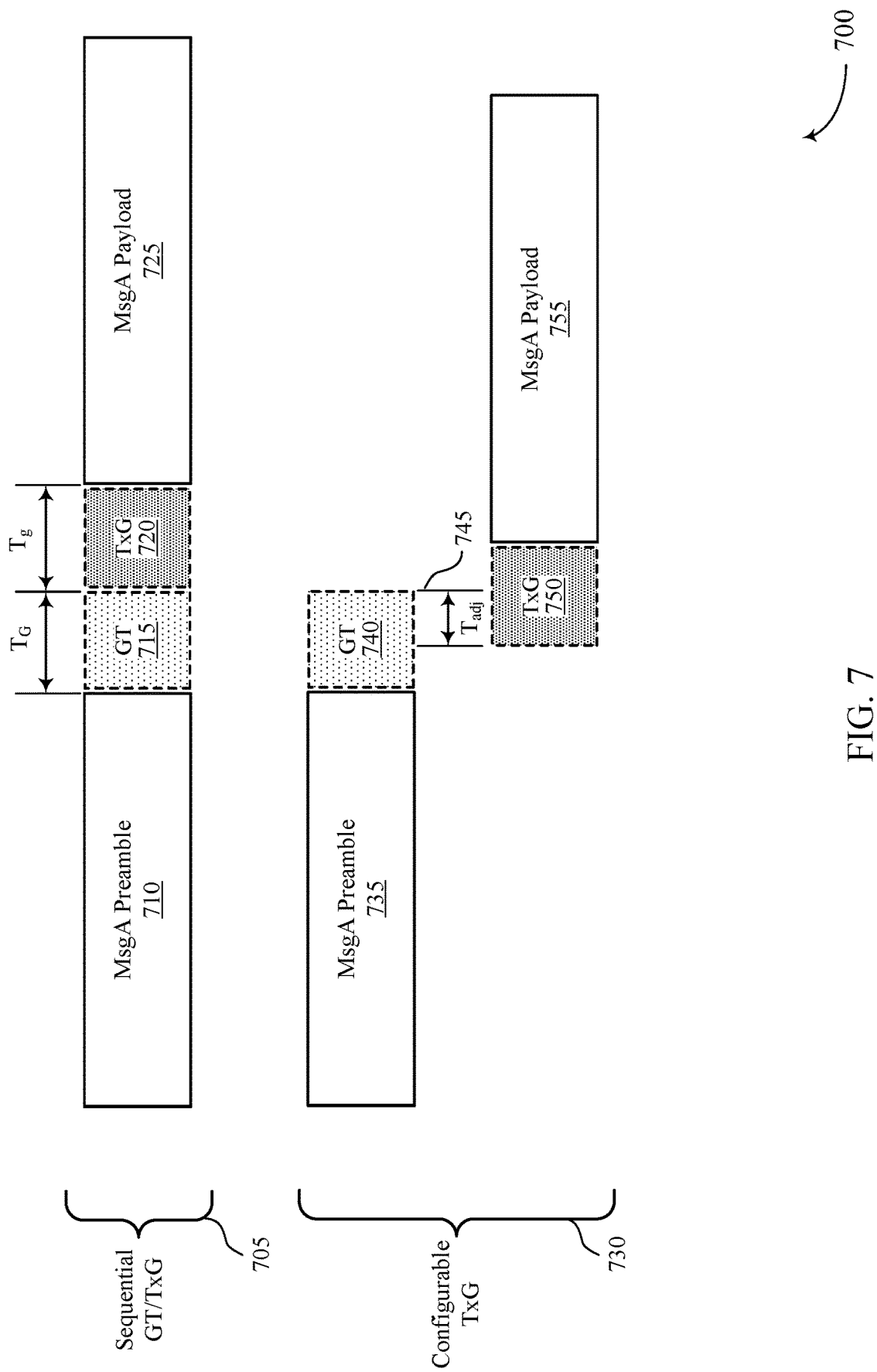
FIG. 7 illustrates an example of a transmission gap determination for random access messages in accordance with aspects of the present disclosure.

FIG. 7 illustrates an example of a transmission gap determination 700 in accordance with aspects of the present disclosure. In some examples, transmission gap determination 700 may implement aspects of wireless communications system 100 or 200. In this example, a sequential guard time and transmission gap implementation 705 and a configurable transmission gap implementation 730 are illustrated.

In the example of a sequential guard time and transmission gap implementation 705 a preamble 710 (e.g., a MsgA preamble) may be transmitted, followed by a guard time 715, transmission gap 720, and payload 725 (e.g., a MsgA payload). The combination of the guard time 715 and the transmission gap 720 may allow for retuning of UE transmitters, that may be due to potential differences in numerology, transmission power, transmission bandwidth, sampling rate, or combinations thereof, between the preamble 710 and the payload 725. Such a gap may allow for simplified UE implementation and may also reduce potential inter-symbol interference of the random access message. As discussed above, aspects of the present disclosure provide that a total duration of the transmission gap may be configured to provide reduction in the gap duration, alignment of random access transmissions of multiple UEs, or any combinations thereof.

In the example of a configurable transmission gap implementation 730, a preamble 735 (e.g., the MsgA preamble) may be transmitted, followed by guard time 740, if necessary based on the preamble 735. In cases where the guard time 740 is necessary, the transmission gap 750 may be configured such that it overlaps with some or all of the guard time 740. In some cases, the UE may determine a duration of the transmission gap 750 based on one or more parameters associated with the random access configuration, based on a LBT procedure, or any combinations thereof. The transmission gap 750 may also be adjusted based on a timing adjustment 745 ($T_{adj}$) determined by the UE, such as an estimated propagation delay determined based on one or more RS measurements at the UE. The random access payload 755 (e.g., MsgA payload) may be transmitted following the transmission gap 750.

In some cases, the transmission gap 750 may be configured based at least in part on a transmit power time mask, the guard time of the preamble 735, the timing adjustment 745 that may be applied to the preamble 735 and/or payload 755 transmission, an EVM window, or any combinations thereof. In some cases, an initial duration of the transmission gap 750 may be determined that includes the duration of any guard time 740, based on a configured table that has different initial transmission gap durations for different combinations of guard times, EVM widow durations, transmit power time masks, or any combinations thereof. In such cases, the UE may adjust the initial duration of the transmission gap 750 based on the timing adjustment 745, and insert the gap between the preamble 735 and payload 755 when formatting the random access message. Such techniques may provide a systematic method for transmission gap configuration, which helps to achieve a good tradeoff between overhead, spectral efficiency and receiver complexity reduction. In some examples, the duration ($T_g$) of the transmission gap may be configurable, and depend on implementation limits and timing adjustment procedures. In some cases, the duration, Tg, may be determined according to the relationship that:

$$T_g \geq (\max(\text{transient period time mask}, \text{guard time preamble}) + (\text{payload EVM Window}) - T_{adj}).$$

The transmission gap may be configured, in some cases, such that one or both of the preamble 735 and the payload 755 are transmitted so as to be aligned with a RO window at the base station. Such alignment of random access transmissions may allow for reduced complexity in decoding of the transmissions at the UE, as an amount of buffering and decoding hypotheses may be reduced based on the RO window alignment. Further, in cases where the base station is jointly decoding multiple concurrent transmissions from multiple UEs, such joint decoding may be performed more efficiently based on the RO window alignment.

Figure 8:
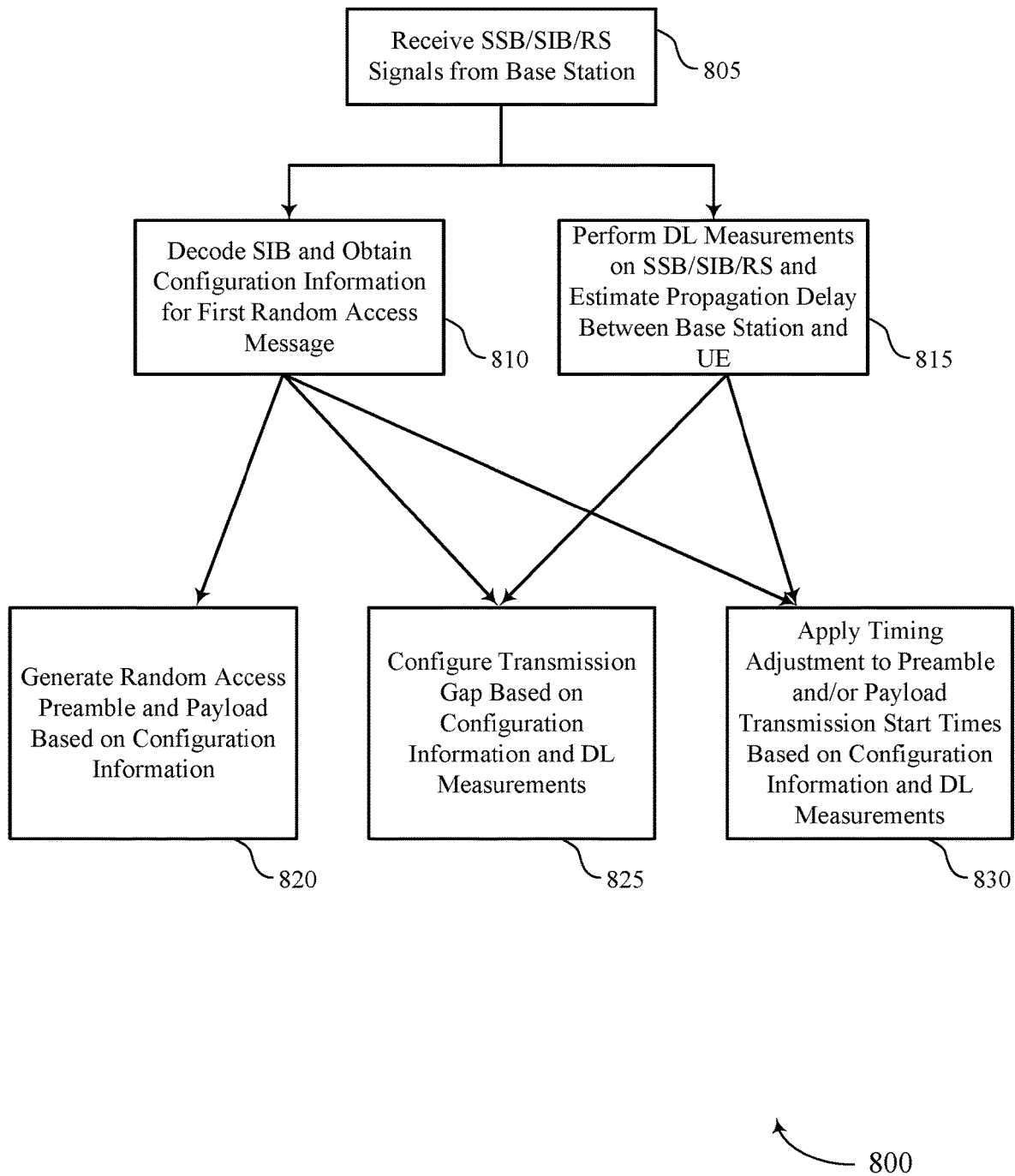
FIG. 8 illustrates an example of a timing adjustment technique that supports transmission gap configuration for random access messages in accordance with aspects of the present disclosure.

FIG. 8 illustrates an example of a timing adjustment technique 800 that supports transmission gap configuration for random access messages in accordance with aspects of the present disclosure. In some examples, timing adjustment technique 800 may implement aspects of wireless communications system 100 or 200. In this example, a UE may generate a random access message (e.g., a MsgA) that includes a transmission gap between a preamble and payload in accordance with techniques discussed herein.

At 805, the UE may receive one or more of a SSB, SIB, or RS from a base station. In some cases, the UE may monitor for one or more SSBs (e.g., in a beam sweeping procedure), and determine resources for receiving a SIB based on a SSB.

At 810, the UE may decode the SIB and obtain configuration information for a first random access message (e.g., a MsgA of a two-step RACH procedure). In some cases, the configuration information may provide random access resources (e.g., frequency, time, and/or spatial resources) for one or more RO windows that may be used to transmit a preamble or payload as part on the random access procedure. In some cases, the configuration information may also include a preamble length, bandwidth, SCS, power control information, or any combinations thereof. In some cases, the UE may determine one or more parameters associated with the random access configuration based on preconfigured tables that provide such parameters (e.g., guard time, EVM window duration, transient period time mask, or combinations thereof).

At 815, the UE may perform one or more downlink measurements on the received SSB, SIB, RS, or any combinations thereof, and estimate a propagation delay between the base station and the UE. In some cases, the estimated propagation delay may be used as a timing adjustment for the random access message transmission.

At 820, the UE may generate a random access preamble and random access payload, based at least in part on the configuration information. The UE, at 825, may also configure a transmission gap based on the configuration information and the downlink measurements. For example, the UE may determine an initial value of the transmission gap based on the guard time, transient period time mask, EVM window duration, or combinations thereof, based on the parameters as determined from the configuration information (e.g., based on one or more preconfigured tables that provide initial transmission gap time durations for different combinations of random access configuration parameters).

At 830, the UE may apply the timing adjustment to the preamble or payload, or both, to determine transmission start times for the preamble and payload based on the configuration information and downlink measurements. In some cases, the timing adjustment may be applied to reduce the initial transmission gap time duration by an amount of the timing adjustment. The timing adjustment may provide, for example, that the preamble, payload, or both, are transmitted such that the transmissions are received at the base station and aligned with an associated RO window. In some cases, the UE may apply the timing adjustment to both preamble and payload. In other cases, the UE may apply the timing adjustment to only the payload. In other cases, the UE may not apply any timing adjustment (e.g., a zero timing adjustment) to either of the random access transmissions.

Figure 10:
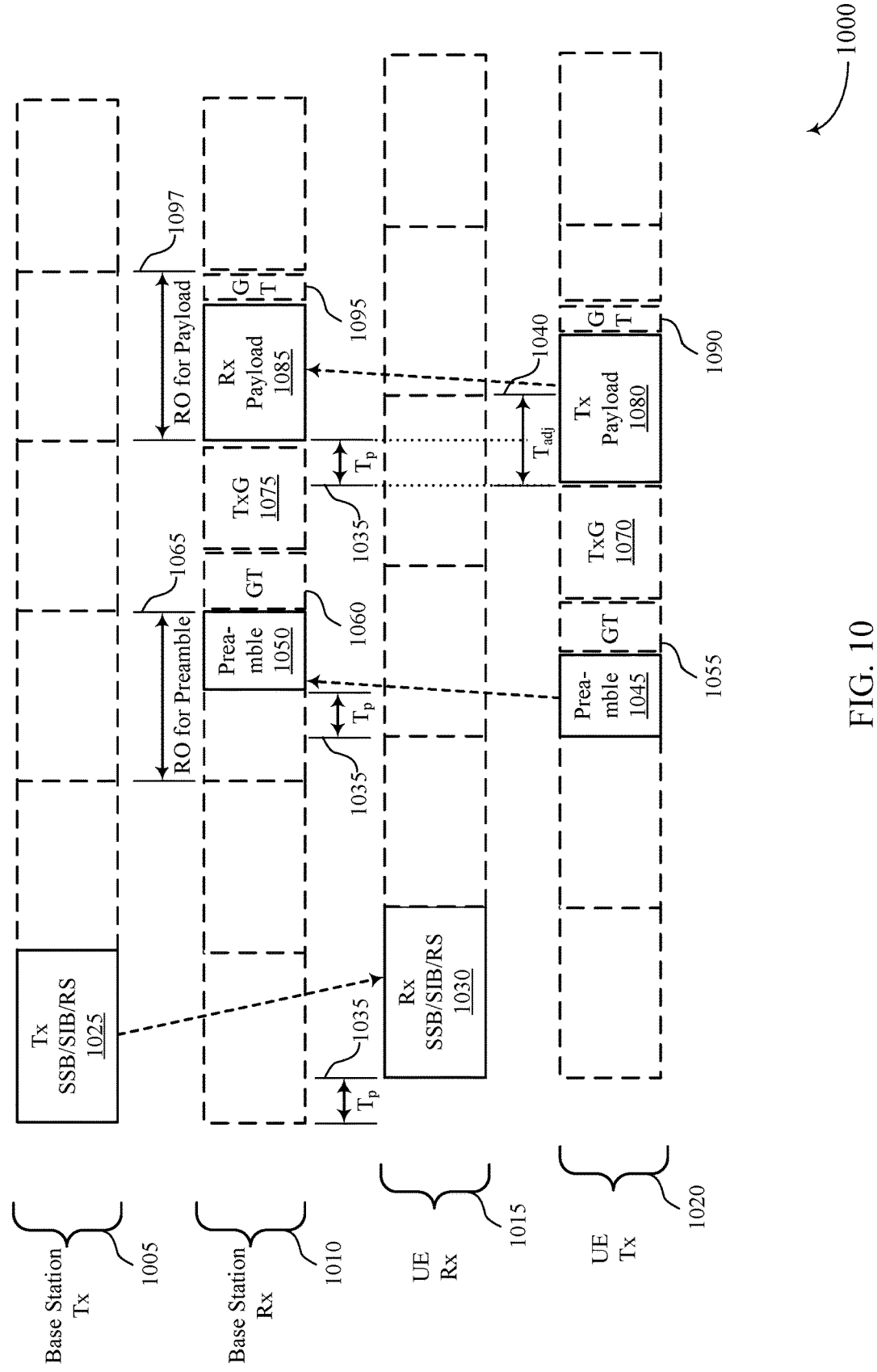
FIG. 10 illustrates an example of a payload timing adjustment that supports transmission gap configuration for random access messages in accordance with aspects of the present disclosure.
Figure 11:
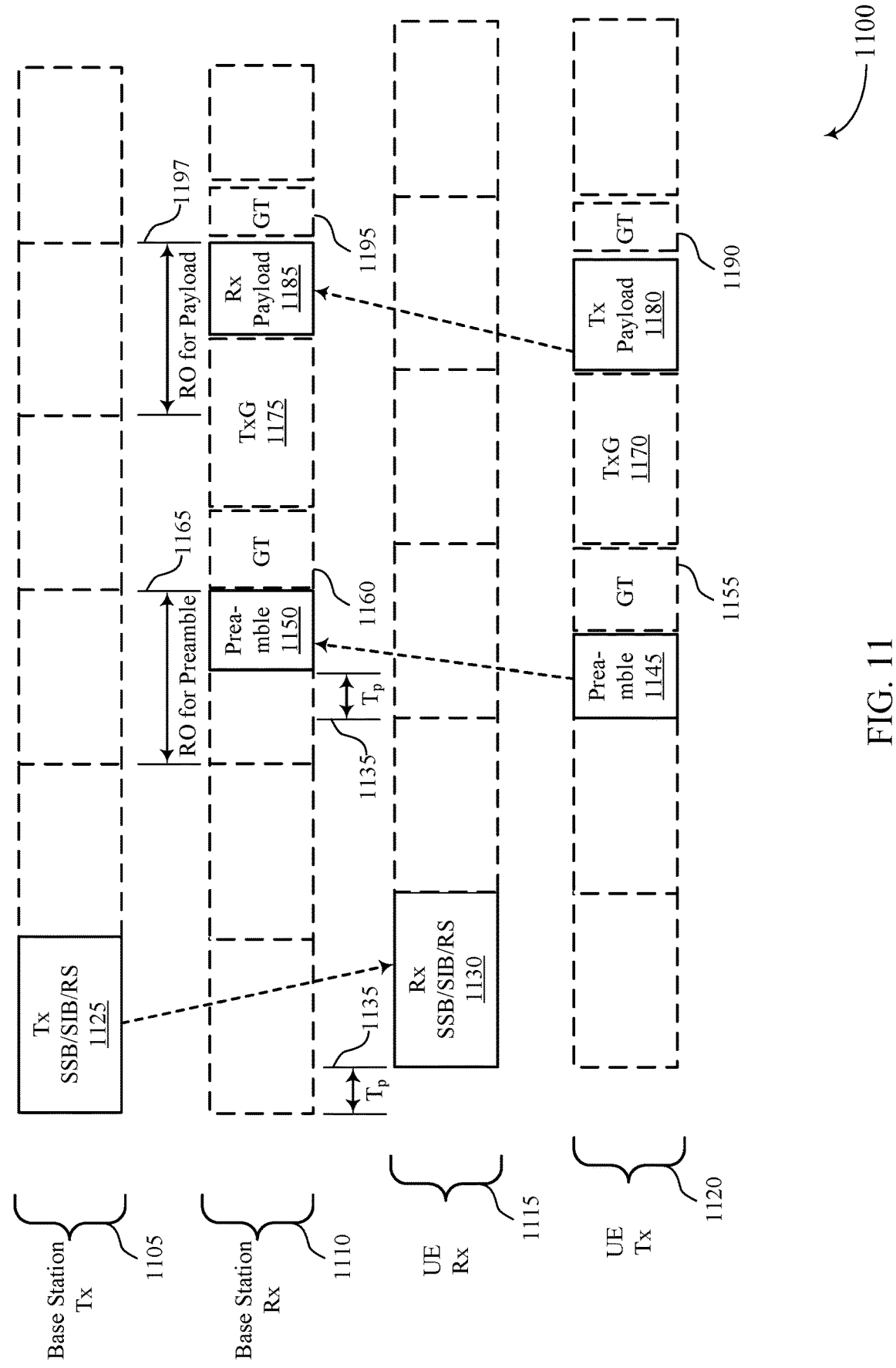
FIG. 11 illustrates an example of a zero timing adjustment that supports transmission gap configuration for random access messages in accordance with aspects of the present disclosure.

In some cases, the UE may select which timing adjustment option to use based on the downlink measurements made by the UE. In some cases, the random access preamble selection may be based on which timing adjustment option is selected (e.g., random access preambles may be partitioned based on whether the timing adjustment is applied to the preamble, payload, both the preamble and payload, or not applied at all). In some cases, the random access configuration information may indicate to the UE which timing adjustment options are available for the UE to select. Examples of several different timing adjustment options are illustrated in the examples of FIGS. 9-11.

Figure 9:
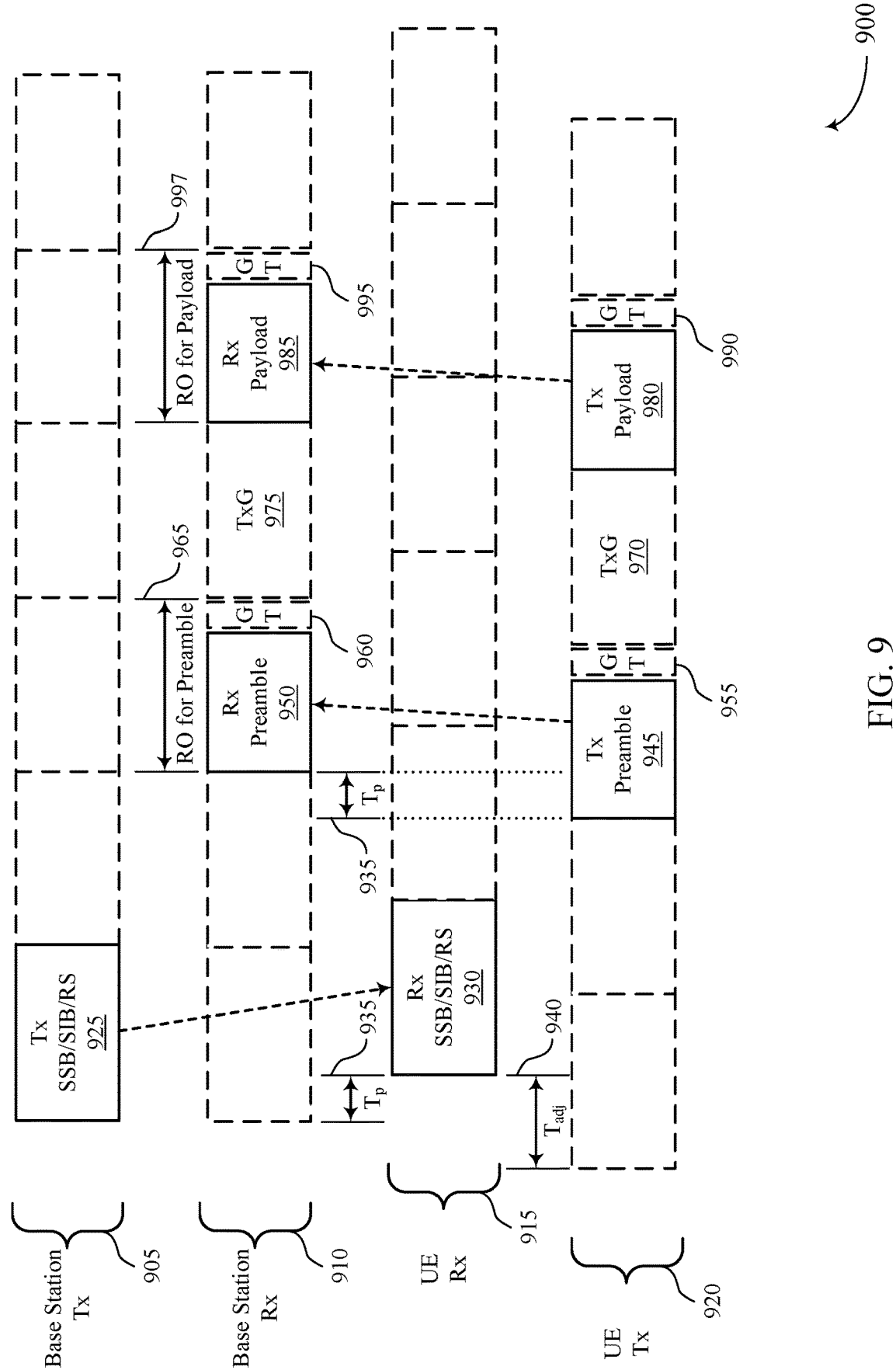
FIG. 9 illustrates an example of a preamble and payload timing adjustment that supports transmission gap configuration for random access messages in accordance with aspects of the present disclosure.

FIG. 9 illustrates an example of a preamble and payload timing adjustment 900 that supports transmission gap configuration for random access messages in accordance with aspects of the present disclosure. In some examples, preamble and payload timing adjustment 900 may be implemented in aspects of wireless communications system 100 or 200. In this example, a base station transmission timeline 905, a base station reception timeline 910, a UE reception timeline 915, and a UE transmission timeline 920 are illustrated, in which the UE may perform timing adjustment to both the random access preamble and random access payload.

In this example, the base station may transmit a SSB/SIB/RS at 925, and the UE may receive the SSB/SIB/RS at 930, after a propagation delay 935 ($T_p$). In some cases, the UE may measure received transmissions (e.g., received RS transmissions), and estimate the propagation delay 935. The estimated propagation delay 935 may be used to determine timing adjustment 940 ($T_{adj}$), which represents a total time difference between when a transmission is received from the base station and a transmission is to be transmitted to the base station so as to align with transmission boundaries at the base station (e.g., one or more RO windows).

The UE may transmit random access preamble at 945, such that the preamble transmission starts in advance of RO window 965 for the preamble by an amount of the propagation delay 935. The preamble may have an associated guard time 955 at the UE, which corresponds to guard time 960 at the base station. The UE may insert transmission gap 970 after the preamble transmission 945, which corresponds to transmission gap 975 at the base station. The UE may then transmit the random access payload at 980, such that a start time of the payload transmission starts in advance of a RO window 997 for the payload by an amount of the propagation delay 935. The base station may receive the random access payload at 985, which is aligned with RO window 997. In this example, the random access payload may have an associated guard time 990 at the UE, which corresponds to guard time 995 at the base station. The base station may perform preamble detection and payload decoding in accordance with the RO window 965 for the preamble and the RO window 997 for the payload. By applying the timing adjustment, the UE can provide transmissions that are aligned with the RO windows 965 and 997, which may simplify processing at the base station and also may enhance the likelihood of successful reception and decoding of the transmissions at the base station.

FIG. 10 illustrates another example of a payload timing adjustment 1000 that supports transmission gap configuration for random access messages in accordance with aspects of the present disclosure. In some examples, payload timing adjustment 1000 may be implemented in aspects of wireless communications system 100 or 200. In this example, a base station transmission timeline 1005, a base station reception timeline 1010, a UE reception timeline 1015, and a UE transmission timeline 1020 are illustrated, in which the UE may perform timing adjustment to the random access payload but not the random access preamble.

In this example, the base station may transmit a SSB/SIB/RS at 1025, and the UE may receive the SSB/SIB/RS at 1030, after a propagation delay 1035 ($T_p$). In some cases, the UE may measure received transmissions (e.g., received RS transmissions), and estimate the propagation delay 1035. The estimated propagation delay 1035 may be used to determine timing adjustment 1040 ($T_{adj}$), which represents a total time difference between when a transmission is received from the base station and a transmission is to be transmitted to the base station so as to align with transmission boundaries at the base station (e.g., one or more RO windows).

The UE may transmit random access preamble at 1045 without any adjustment based on the estimated propagation delay 1035, such that the base station receives the preamble at 1050 after a time corresponding to propagation delay 1035. In this example, the RO window 1065 for the preamble may be set such that the base station will receive preambles from one or more UEs during the RO window 1065. In some cases, the preamble may have a guard time 1055 that corresponds to guard time 1060 at the base station.

The UE may insert transmission gap 1070 after the preamble transmission 1045, which corresponds to transmission gap 1075 at the base station. The UE may then transmit the random access payload at 1080, such that a start time of the payload transmission starts in advance of a RO window 1097 for the payload by an amount of the propagation delay 1035. The base station may receive the random access payload at 1085, which is aligned with RO window 1097. In this example, the random access payload may have an associated guard time 1090 at the UE, which corresponds to guard time 1095 at the base station.

The base station may perform preamble detection and payload decoding in accordance with the RO window 1065 for the preamble and the RO window 1097 for the payload. By applying the timing adjustment to the payload transmission, the UE can provide the transmission so as to be aligned with the RO window 1097, which may simplify processing at the base station and also may enhance the likelihood of successful reception and decoding of the transmissions at the base station. The base station may perform preamble detection during RO window 1065 based on an assumption that one or more UEs may transmit preambles that may arrive at the base station at any point during the RO window 1065. In some cases, the preambles configured for selection at the UE may allow for relatively straightforward preamble detection in such cases (e.g., based on preamble length, a number of repetitions of a preamble sequence, etc.).

FIG. 11 illustrates an example of a zero timing adjustment timeline 1100 that supports transmission gap configuration for random access messages in accordance with aspects of the present disclosure. In some examples, zero timing adjustment timeline 1100 may be implemented in aspects of wireless communications system 100 or 200. In this example, the UE may not apply any timing adjustments for random access transmissions. Similarly as discussed in the examples of FIGS. 9 and 10, in this example a base station transmission timeline 1105, a base station reception timeline 1110, a UE reception timeline 1115, and a UE transmission timeline 1120 are illustrated, in which the UE may not perform timing adjustment to the random access payload or the random access preamble.

In this example, the base station may transmit a SSB/SIB/RS at 1125, and the UE may receive the SSB/SIB/RS at 1130, after a propagation delay 1135 (TA The UE may transmit random access preamble at 1145 without any adjustment based on the propagation delay 1135, such that the base station receives the preamble at 1150 after a time corresponding to propagation delay 1135. In this example, the RO window 1165 for the preamble may be set such that the base station will receive preambles from one or more UEs during the RO window 1165. In some cases, the preamble may have a guard time 1155 that corresponds to guard time 1160 at the base station.

The UE may insert transmission gap 1170 after the preamble transmission 1145, which corresponds to transmission gap 1175 at the base station. The UE may then transmit the random access payload at 1180, again without any adjustment based on the propagation delay 1135, such that the base station receives the payload at 1185 after a time corresponding to propagation delay 1135. In some cases, the base station may configure the RO window 1197 to allow for payload transmissions that do not account for the propagation delay 1135. In this example, the random access payload may have an associated guard time 1190 at the UE, which corresponds to guard time 1195 at the base station.

The base station may perform preamble detection and payload decoding in accordance with the RO window 1165 for the preamble and the RO window 1197 for the payload. The base station may perform preamble detection during RO window 1165 based on an assumption that one or more UEs may transmit preambles that may arrive at the base station at any point during the RO window 1165. Likewise, the base station may perform payload decoding during RO window 1197 based on an assumption that one or more UEs may transmit payloads that may arrive at the base station at any point during the RO window 1197. In some cases, the base station may use one or more delayed preamble transmissions to estimate when corresponding payload transmissions will arrive within RO window 1197. In some cases, to align payloads from different UEs within the RO window 1197, the base station may provide a configuration that allows different UEs to configure different transmission gaps 1170, the base station may extend the duration of the RO window 1197 the base station may perform timing adjustment on received signals, or any combinations thereof. Such examples may provide higher complexity processing at the base station, but may provide simpler processing and measurement estimations at the UE.

Figure 12:
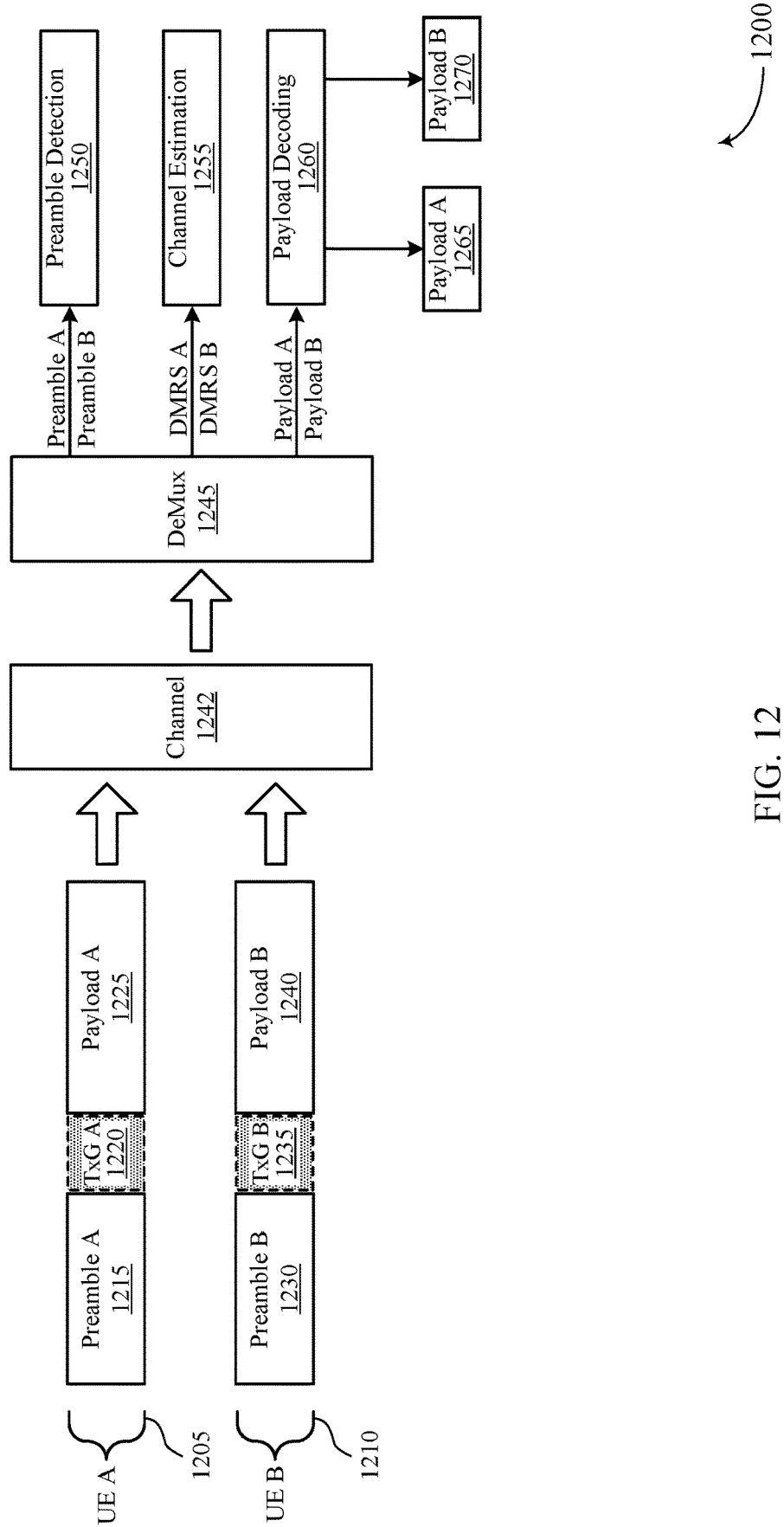
FIG. 12 illustrates an example of a joint decoding technique that supports transmission gap configuration for random access messages in accordance with aspects of the present disclosure.

FIG. 12 illustrates an example of a joint decoding technique 1200 that supports transmission gap configuration for random access messages in accordance with aspects of the present disclosure. In some examples, joint decoding technique 1200 may be implemented in aspects of wireless communications system 100 or 200. As indicated above, in some cases multiple UEs may attempt to transmit random access messages using the same random access resources (e.g., the same time, frequency, and spatial resources). In such cases, the base station may perform joint preamble detection and payload decoding.

In the example of FIG. 12, a first UE 1205 may transmit a random access message with a first preamble 1215, a first transmission gap 1220, and a first payload 1225, and a second UE 1210 may transmit a random access message with a second preamble 1230, a second transmission gap 1235, and a second payload 1240. In some cases, each of the first payload 1225 and the second payload 1240 may include a DMRS to assist with demodulation and decoding at the base station.

The concurrent transmissions may use a same wireless channel 1242, and be received at the base station. The base station may demultiplex the received transmissions in time at demultiplexer 1245, such that superimposed preambles may be provided to preamble detection component 1250, superimposed DMRS transmissions may be provided to channel estimation component 1255, and superimposed payloads may be provided to payload decoding component 1260. With the insertion of the transmission gaps 1220 and 1235 and UE-centric timing adjustments, all or a portion of the superimposed signals may be aligned in time at the base station. Such time alignment may allow for joint detection and decoding, such as with successive interference cancelation (SIC) at one or both of the preamble detection component 1250 and the payload decoding component 1260, and the base station may decode the first payload 1265 and the second payload 1270. Such concurrent random access transmissions may further enhance network efficiency by allowing detection and decoding of multiple random access messages at the base station, and the time alignment of one or both of the preamble and payload transmissions may provide for less complex joint detection and decoding.

Figure 13:
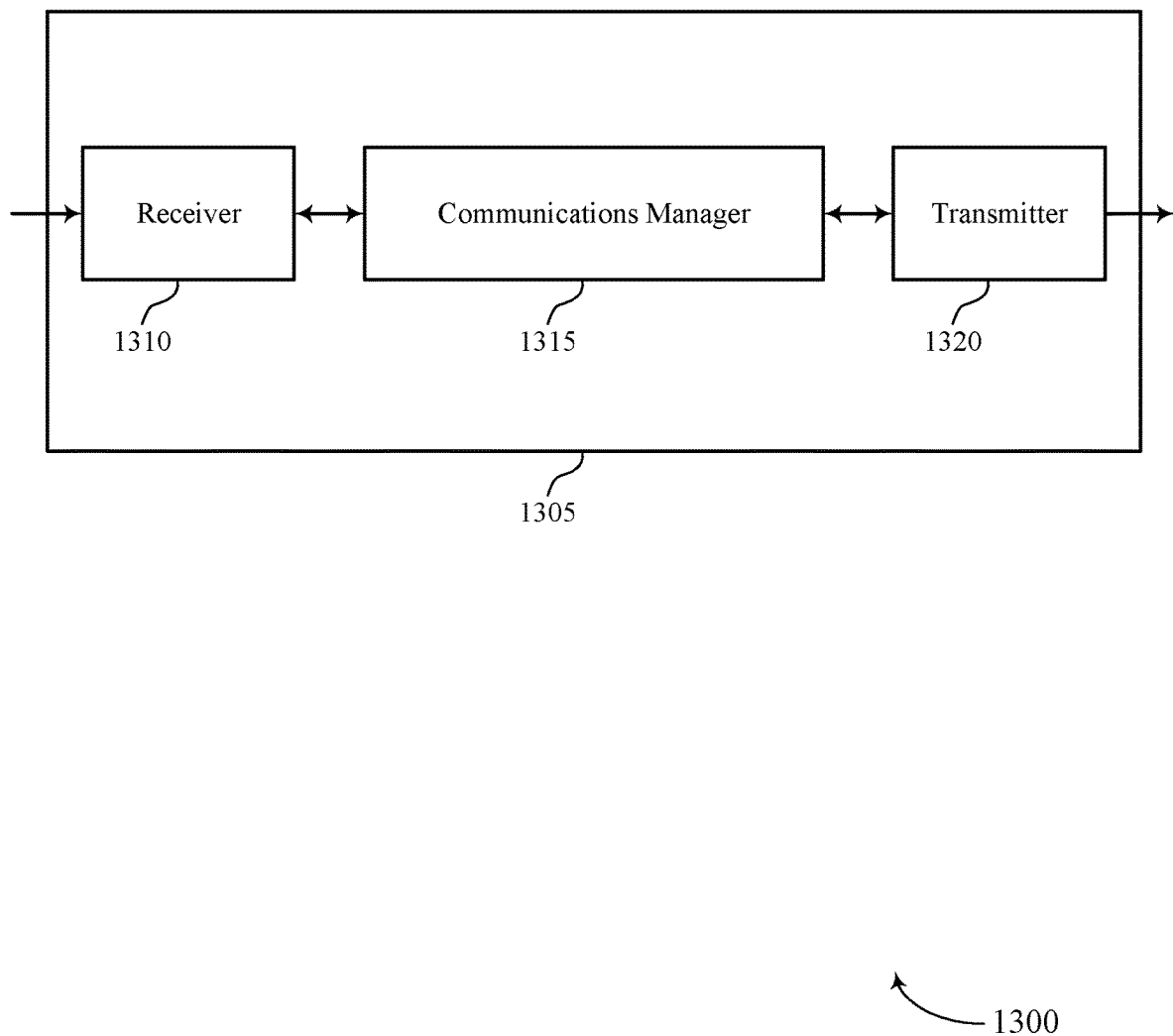
FIGS. 13 and 14 show block diagrams of devices that support transmission gap configuration for random access messages in accordance with aspects of the present disclosure.

FIG. 13 shows a block diagram 1300 of a device 1305 that supports transmission gap configuration for random access messages in accordance with aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to transmission gap configuration for random access messages, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify random access channel resources for transmission of a random access message that includes a random access preamble and a random access payload, determine a time duration of a transmission gap to be provided between an ending time of the random access preamble and a starting time of the random access payload, the time duration of the transmission gap based on a configuration of the random access channel resources provided by a base station, and transmit the random access message to the base station based on the determining. The communications manager 1315 may be an example of aspects of the communications manager 1610 described herein.

The communications manager 1315 may as described herein be implemented to realize one or more potential advantages. One implementation may allow the device 1305 to perform a two-step random access procedure that may provide enhanced efficiency and reduced overhead relative to a four-step random access procedure that may be used in some cases. Further, some implementations may allow the device 1305 to efficiently determine the transmission gap between a random access preamble and random access payload, which may allow for reduced device complexity when different transmission parameters (e.g., different SCS) are used for a preamble and payload transmission.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
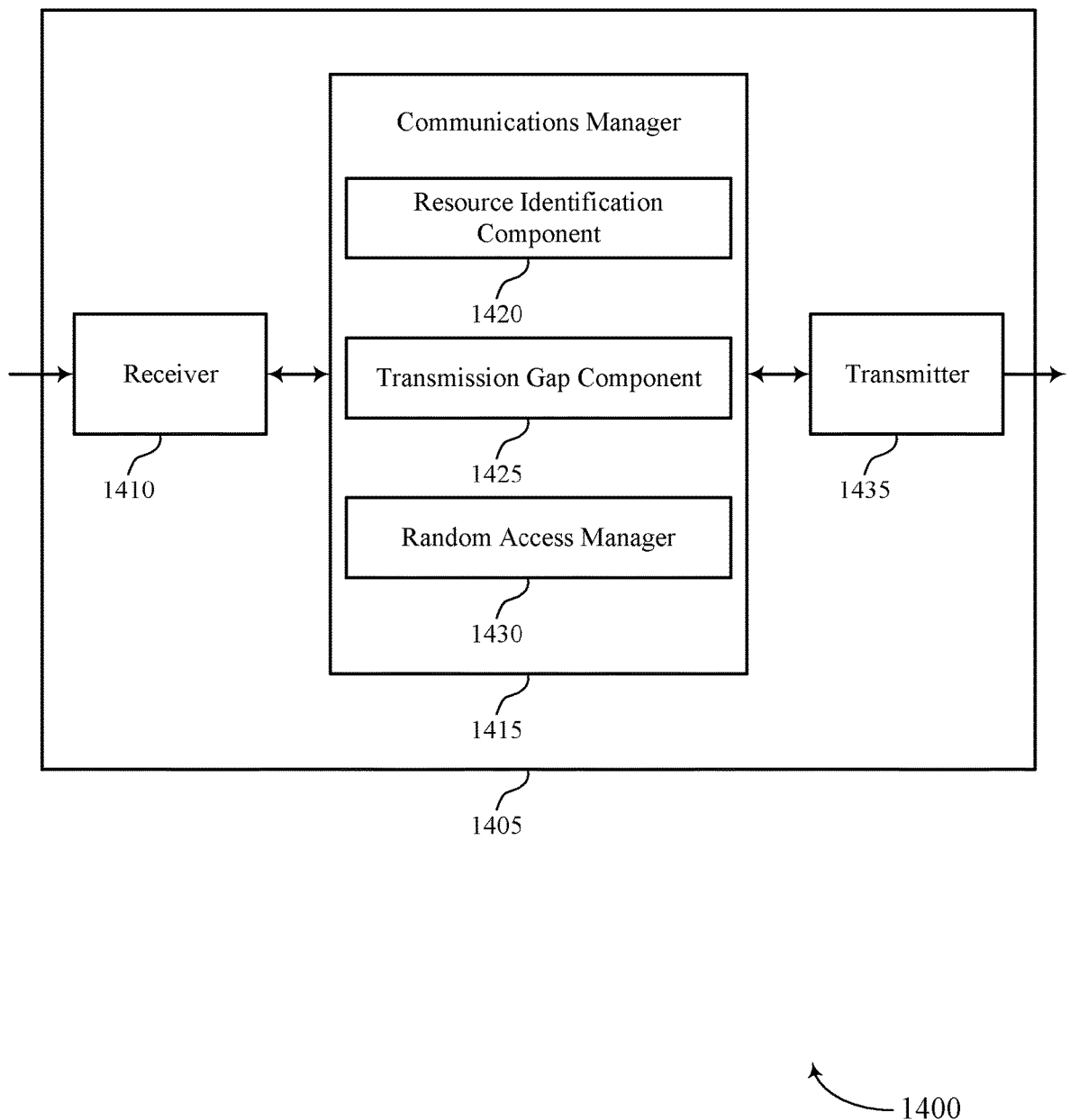

FIG. 14 shows a block diagram 1400 of a device 1405 that supports transmission gap configuration for random access messages in accordance with aspects of the present disclosure. The device 1405 may be an example of aspects of a device 1305, or a UE 115 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to transmission gap configuration for random access messages, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a resource identification component 1420, a transmission gap component 1425, and a random access manager 1430. The communications manager 1415 may be an example of aspects of the communications manager 1610 described herein.

The resource identification component 1420 may identify random access channel resources for transmission of a random access message that includes a random access preamble and a random access payload.

The transmission gap component 1425 may determine a time duration of a transmission gap to be provided between an ending time of the random access preamble and a starting time of the random access payload, the time duration of the transmission gap based on a configuration of the random access channel resources provided by a base station.

The random access manager 1430 may transmit the random access message to the base station based on the determining.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
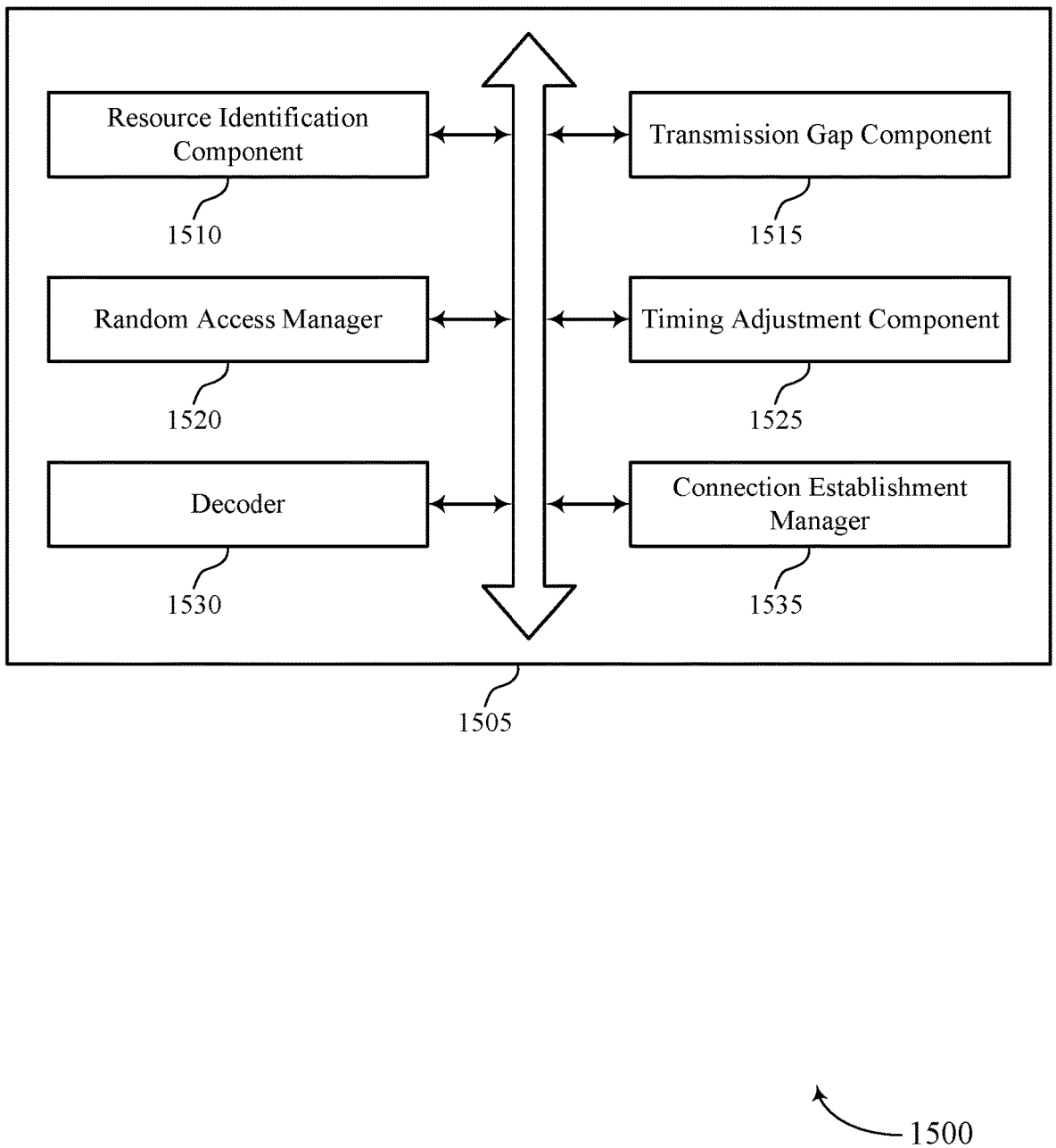
FIG. 15 shows a block diagram of a communications manager that supports transmission gap configuration for random access messages in accordance with aspects of the present disclosure.

FIG. 15 shows a block diagram 1500 of a communications manager 1505 that supports transmission gap configuration for random access messages in accordance with aspects of the present disclosure. The communications manager 1505 may be an example of aspects of a communications manager 1315, a communications manager 1415, or a communications manager 1610 described herein. The communications manager 1505 may include a resource identification component 1510, a transmission gap component 1515, a random access manager 1520, a timing adjustment component 1525, a decoder 1530, and a connection establishment manager 1535. Each of these modules may communicate, directly or indirectly, with one another (e.g., via one or more buses).

The resource identification component 1510 may identify random access channel resources for transmission of a random access message that includes a random access preamble and a random access payload. In some examples, the resource identification component 1510 may determine the configuration of the random access channel resources based on the decoding. In some cases, the random access preamble is transmitted in a first transmission slot and the random access payload is transmitted in a second transmission slot that is different than the first transmission slot. In some cases, the random access preamble and the random access payload have one or more of a different sub-carrier spacing (SCS), transmission power, transmission channel bandwidth, fast Fourier transform (FFT) sampling rate, transmitting and receiving beam configurations, or any combinations thereof.

The transmission gap component 1515 may determine a time duration of a transmission gap to be provided between an ending time of the random access preamble and a starting time of the random access payload, the time duration of the transmission gap based on a configuration of the random access channel resources, a timing adjustment for uplink transmissions from the UE to a base station, or any combination thereof. In some examples, the transmission gap component 1515 may select an initial transmission gap duration based on the configuration of the random access channel resources. In some examples, the transmission gap component 1515 may subtract the timing adjustment from the initial transmission gap duration. In some examples, the transmission gap component 1515 may identify a guard time of the random access preamble based on a random access preamble length configuration. In some examples, the transmission gap component 1515 may identify an error vector measurement (EVM) window of the random access payload based on the configuration of the random access channel resources. In some examples, the transmission gap component 1515 may select the initial transmission gap duration from a set of available transmission gap durations based on the guard time and the EVM window. In some examples, the transmission gap component 1515 may determine whether to adjust the time duration of the transmission gap or both the time duration of the transmission gap and the starting time of the random access preamble based on one or more measurements of one or more downlink transmissions from the base station.

In some examples, the transmission gap component 1515 may insert the transmission gap between the random access preamble and the random access payload. In some cases, the random access message is transmitted using shared radio frequency spectrum, and the selecting the initial transmission gap duration is further based on a channel occupancy time of the random access message and an outcome of a LBT procedure. In some cases, at least a subset of the set of available transmission gap durations are based on the channel occupancy time of the random access message and an outcome of the LBT procedure. In some cases, the set of available transmission gap durations include a set of transmission gap durations that are mapped to different combinations of values of the guard time and the EVM window. In some cases, at least a subset of the set of available transmission gap durations are based on a transient period time mask duration for switching a wireless transmitter at the UE between a power-on state and a power-off state. In some cases, the starting time of the random access payload is aligned with a starting time of a random access occasion time window at the base station.

The random access manager 1520 may transmit the random access message to the base station based on the determining. In some examples, the random access manager 1520 may generate the random access preamble and the random access payload for transmission in the random access message. In some examples, the random access manager 1520 may apply the timing adjustment to one or more of the random access preamble or the random access payload. In some examples, the random access manager 1520 may receive a second message of the two-step random access procedure from the base station responsive to transmitting the first message.

The timing adjustment component 1525 may adjust the initial transmission gap duration based on the timing adjustment to obtain the time duration of the transmission gap. In some examples, the timing adjustment component 1525 may estimate a propagation delay between the UE and the base station. In some examples, the timing adjustment component 1525 may determine the timing adjustment based on the estimated propagation delay. In some examples, the timing adjustment component 1525 may adjust one or more of a starting time of the random access preamble or the time duration of the transmission gap based on the estimated propagation delay. In some examples, the timing adjustment component 1525 may estimate a propagation delay between the UE and the base station based on one or more of the SSB, SIB, or RS. In some examples, the timing adjustment component 1525 may determine the timing adjustment based on the propagation delay.

The decoder 1530 may decode one or more of a synchronization signal block (SSB), SIB, or a reference signal (RS) transmission from the base station. The connection establishment manager 1535 may perform a connection establishment procedure with the base station based on the second message.

Figure 16:
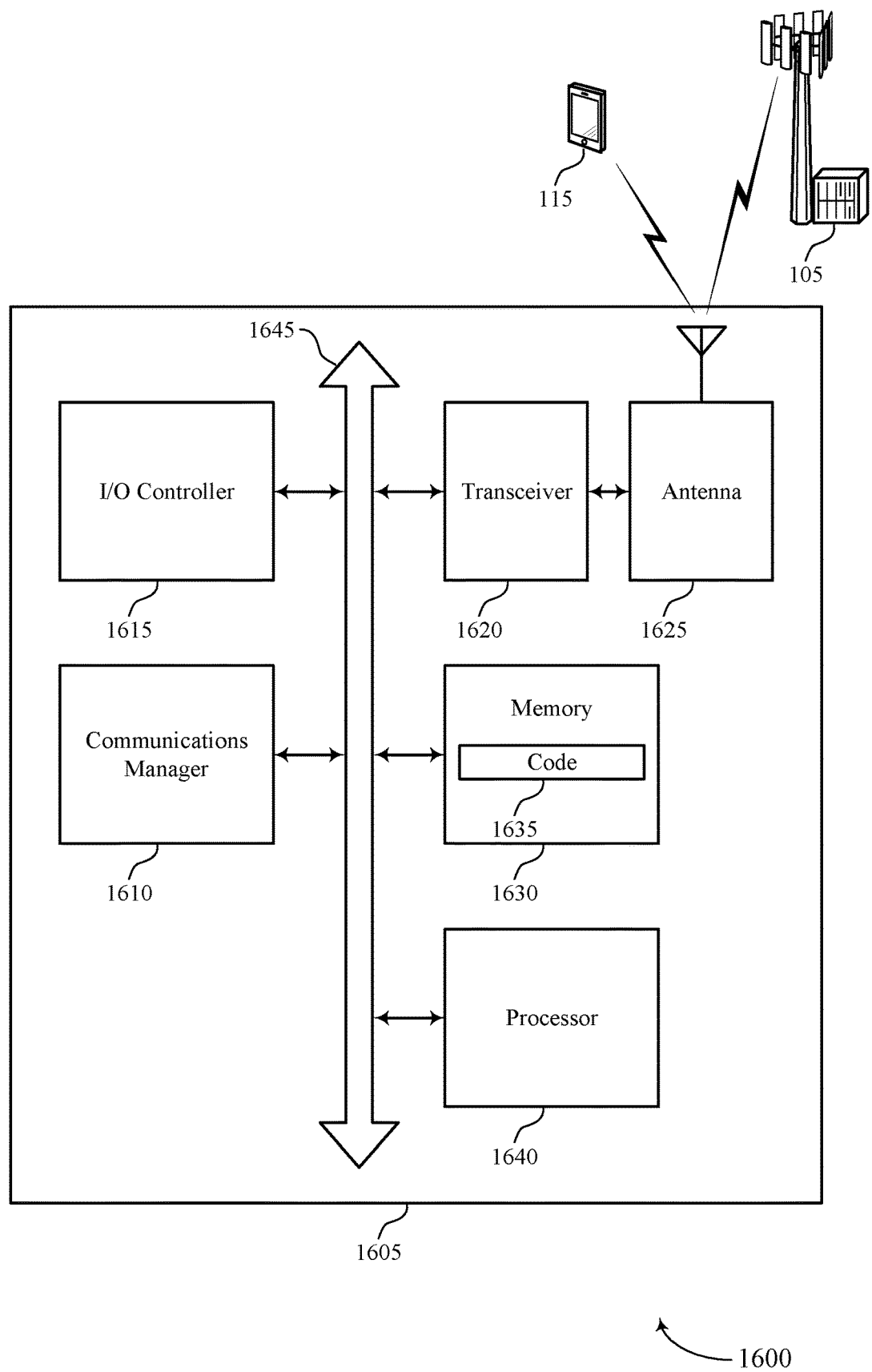
FIG. 16 shows a diagram of a system including a device that supports transmission gap configuration for random access messages in accordance with aspects of the present disclosure.

FIG. 16 shows a diagram of a system 1600 including a device 1605 that supports transmission gap configuration for random access messages in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may identify random access channel resources for transmission of a random access message that includes a random access preamble and a random access payload, determine a time duration of a transmission gap to be provided between an ending time of the random access preamble and a starting time of the random access payload, the time duration of the transmission gap based on a configuration of the random access channel resources provided by a base station, and transmit the random access message to the base station based on the determining.

The device 1605 may as described herein be implemented to realize one or more potential advantages. One implementation may allow the device 1605 to perform a two-step random access procedure that may provide enhanced efficiency and reduced overhead relative to a four-step random access procedure that may be used in some cases. Further, some implementations may allow the device 1605 to efficiently determine the transmission gap between a random access preamble and random access payload, which may allow for reduced device complexity when different transmission parameters (e.g., different SCS) are used for a preamble and payload transmission.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting transmission gap configuration for random access messages).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
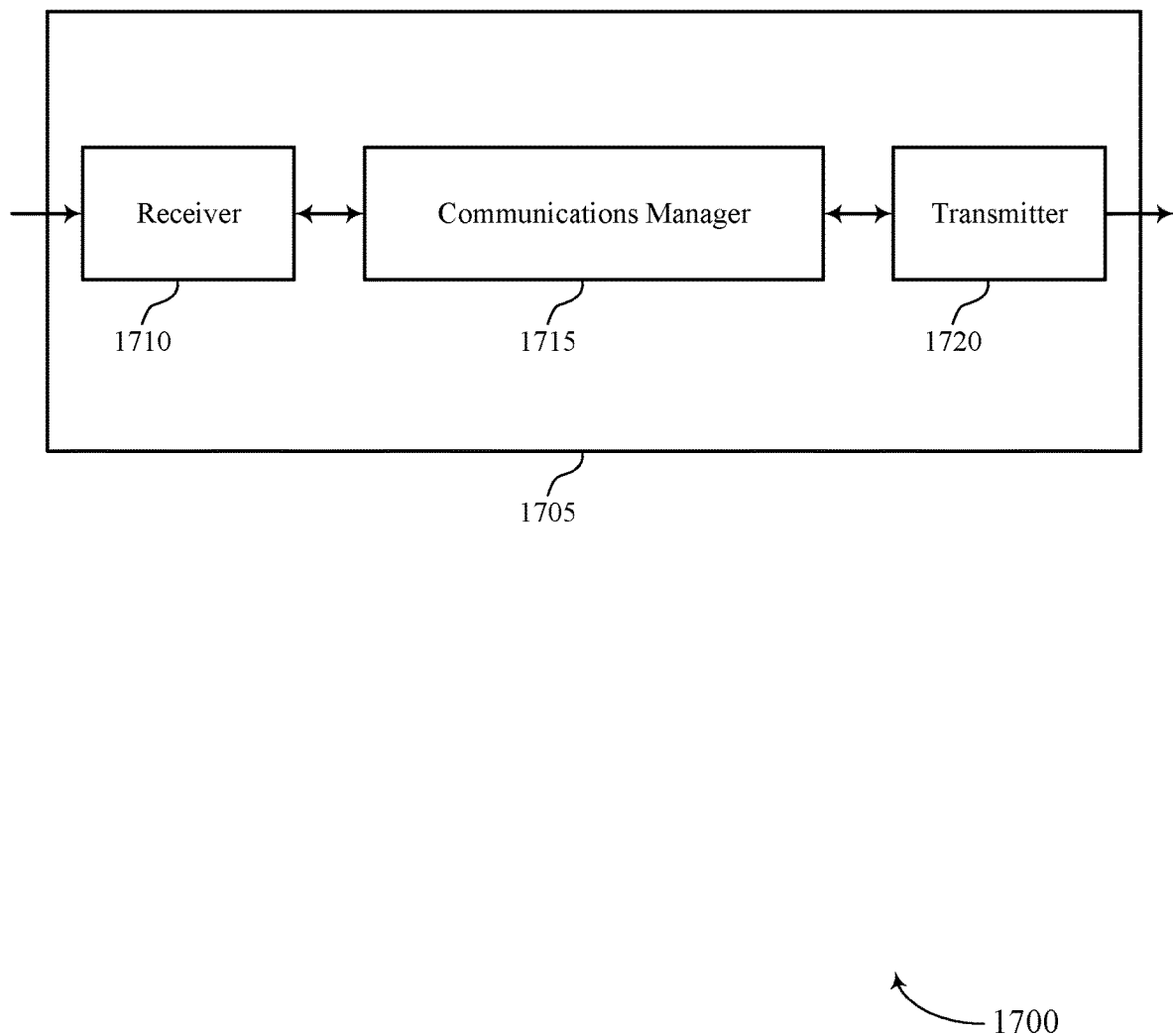
FIGS. 17 and 18 show block diagrams of devices that support transmission gap configuration for random access messages in accordance with aspects of the present disclosure.

FIG. 17 shows a block diagram 1700 of a device 1705 that supports transmission gap configuration for random access messages in accordance with aspects of the present disclosure. The device 1705 may be an example of aspects of a base station 105 as described herein. The device 1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to transmission gap configuration for random access messages, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may transmit a random access channel configuration to at least a first UE and a second UE, where the random access channel configuration provides random access channel resources for transmission of random access messages to the base station and information for a configurable transmission gap within the random access messages, monitor the random access channel resources for one or more random access messages from at least the first UE and the second UE, and decode at least a first random access message from the first UE and a second random access message from the second UE based on a time alignment of at least a portion of the first random access message and the second random access message that is provided by the configurable transmission gap. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
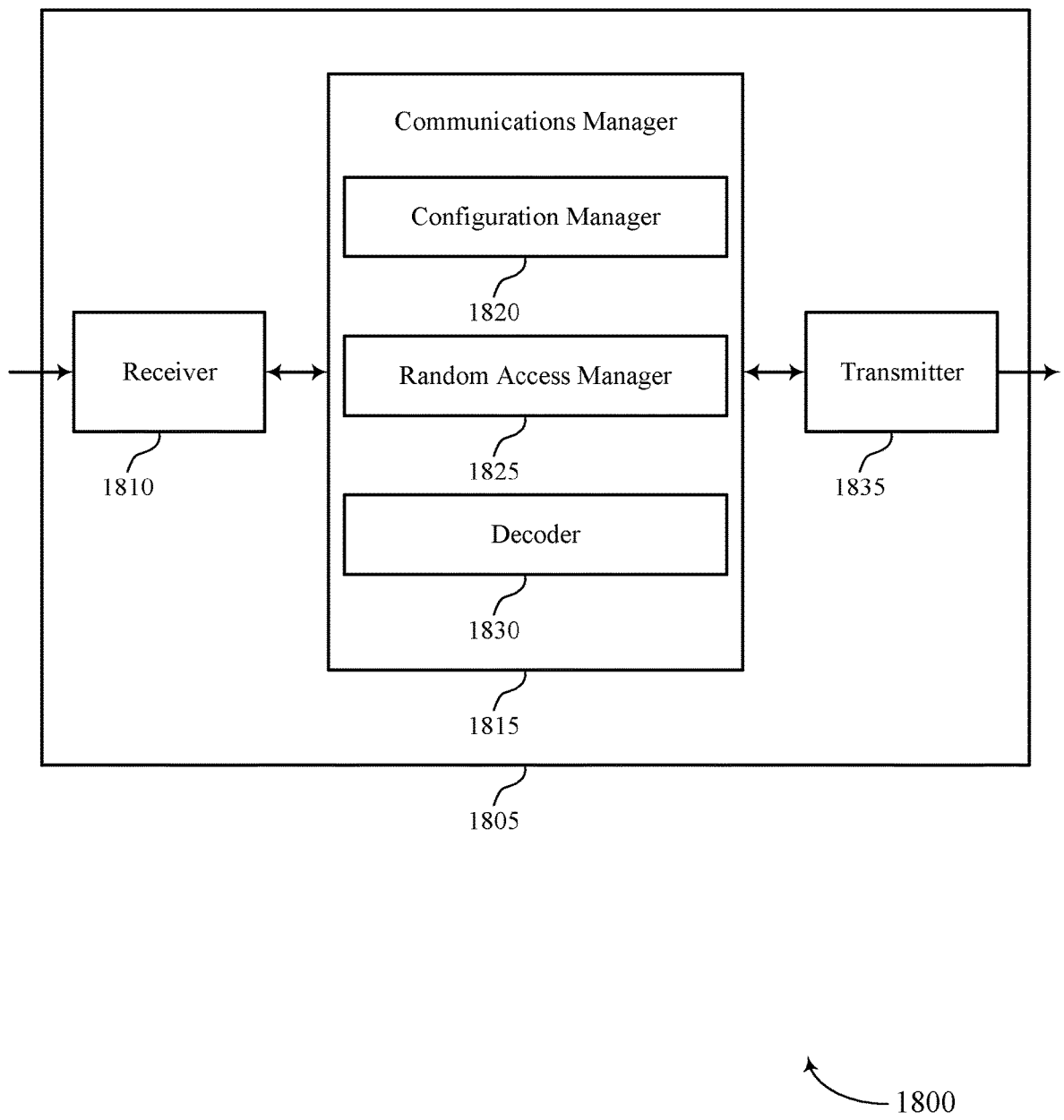

FIG. 18 shows a block diagram 1800 of a device 1805 that supports transmission gap configuration for random access messages in accordance with aspects of the present disclosure. The device 1805 may be an example of aspects of a device 1705, or a base station 105 as described herein. The device 1805 may include a receiver 1810, a communications manager 1815, and a transmitter 1835. The device 1805 may also include a processor. Each of these components may be in communication with one another (e.g., via one or more buses).

The receiver 1810 may receive information such as packets, user data, or control information associated with various information channels (e.g., control channels, data channels, and information related to transmission gap configuration for random access messages, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a configuration manager 1820, a random access manager 1825, and a decoder 1830. The communications manager 1815 may be an example of aspects of the communications manager 2010 described herein.

The configuration manager 1820 may transmit a random access channel configuration to at least a first UE and a second UE, where the random access channel configuration provides random access channel resources for transmission of random access messages to the base station and information for a configurable transmission gap within the random access messages.

The random access manager 1825 may monitor the random access channel resources for one or more random access messages from at least the first UE and the second UE.

The decoder 1830 may decode at least a first random access message from the first UE and a second random access message from the second UE based on a time alignment of at least a portion of the first random access message and the second random access message that is provided by the configurable transmission gap.

The transmitter 1835 may transmit signals generated by other components of the device 1805. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
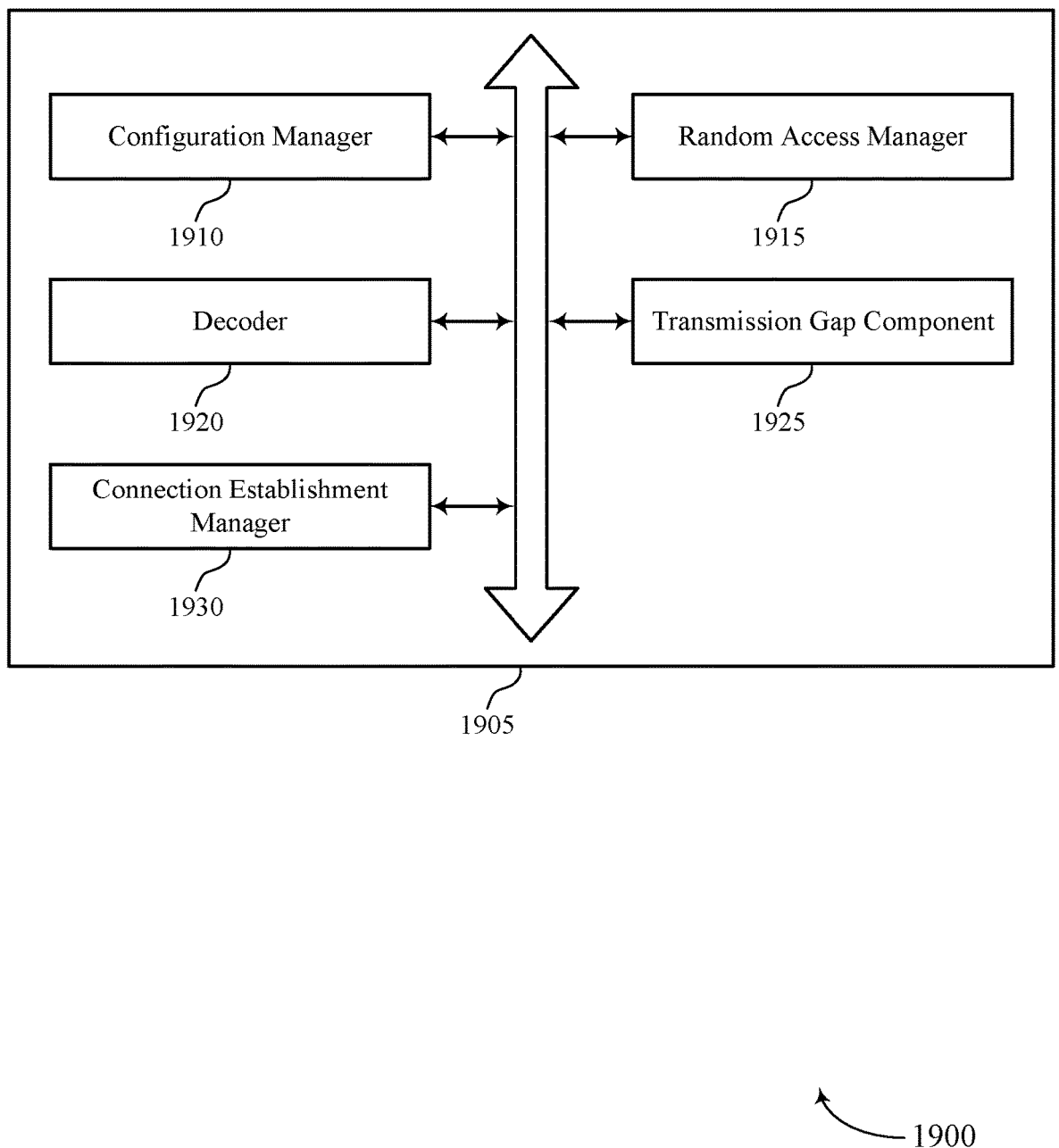
FIG. 19 shows a block diagram of a communications manager that supports transmission gap configuration for random access messages in accordance with aspects of the present disclosure.

FIG. 19 shows a block diagram 1900 of a communications manager 1905 that supports transmission gap configuration for random access messages in accordance with aspects of the present disclosure. The communications manager 1905 may be an example of aspects of a communications manager 1715, a communications manager 1815, or a communications manager 2010 described herein. The communications manager 1905 may include a configuration manager 1910, a random access manager 1915, a decoder 1920, a transmission gap component 1925, and a connection establishment manager 1930. Each of these modules may communicate, directly or indirectly, with one another (e.g., via one or more buses).

The configuration manager 1910 may transmit a random access channel configuration to at least a first UE and a second UE, where the random access channel configuration provides random access channel resources for transmission of random access messages to the base station and information for a configurable transmission gap within the random access messages.

The random access manager 1915 may monitor the random access channel resources for one or more random access messages from at least the first UE and the second UE. In some examples, the random access manager 1915 may transmit a final random access message of the two-step random access procedure (e.g., a MsgB of a 2-step RACH procedure) to each of the first UE and the second UE. In some cases, each random access message includes a random access preamble and a random access payload, and where the configurable transmission gap is inserted between the random access preamble and the random access payload.

The decoder 1920 may decode at least a first random access message from the first UE and a second random access message from the second UE based on a time alignment of at least a portion of the first random access message and the second random access message that is provided by the configurable transmission gap.

In some examples, the decoder 1920 may include a demultiplexer to demultiplex superimposed random access preambles and superimposed random access payloads from each of the first UE and the second UE. In some examples, the decoder 1920 may perform a joint detection procedure to decode the superimposed random access preambles and superimposed random access payloads of each of the first UE and the second UE. In some cases, the joint detection procedure includes one or more of multi-user decoding (MUD) or successive interference cancellation (SIC) to decode the superimposed random access preambles and superimposed random access payloads of each of the first UE and the second UE.

The transmission gap component 1925 may configure random access transmissions to be provided within a random access channel occasion (RO) window. In some cases, the configurable transmission gap provides that the random access payload of each of the first random access message and the second random access message is time-aligned with a starting time of a random access channel occasion for the random access payloads. In some cases, the configurable transmission gap is based on an initial transmission gap duration associated with the random access channel configuration and a timing adjustment applied to the initial transmission gap duration by each UE. In some cases, the timing adjustment is based on a propagation delay between the base station and each UE. In some cases, the initial transmission gap duration is indicated by the random access channel configuration. In some cases, the random access channel configuration indicates one or more of a guard time of a random access preamble, an error vector measurement (EVM) window of a random access payload, a transient period time mask duration for switching a wireless transmitter at each UE between a power-on state and a power-off state, or any combinations thereof. In some cases, the initial transmission gap duration is indicated based on a set of available transmission gap durations that are mapped to different combinations of values of the guard time, the EVM window, the transient period time mask duration, or any combinations thereof. In some cases, the time alignment of at least the portion of the first random access message and the second random access message provides that at least the portion of the first random access message and the second random access message are aligned in time, frequency, and spatial resources and allows decoding of multiple random access messages at a single random access channel occasion at the base station.

The connection establishment manager 1930 may perform a connection establishment procedure with the first UE and the second UE based on the final random access message transmitted to the first UE and the second UE.

Figure 20:
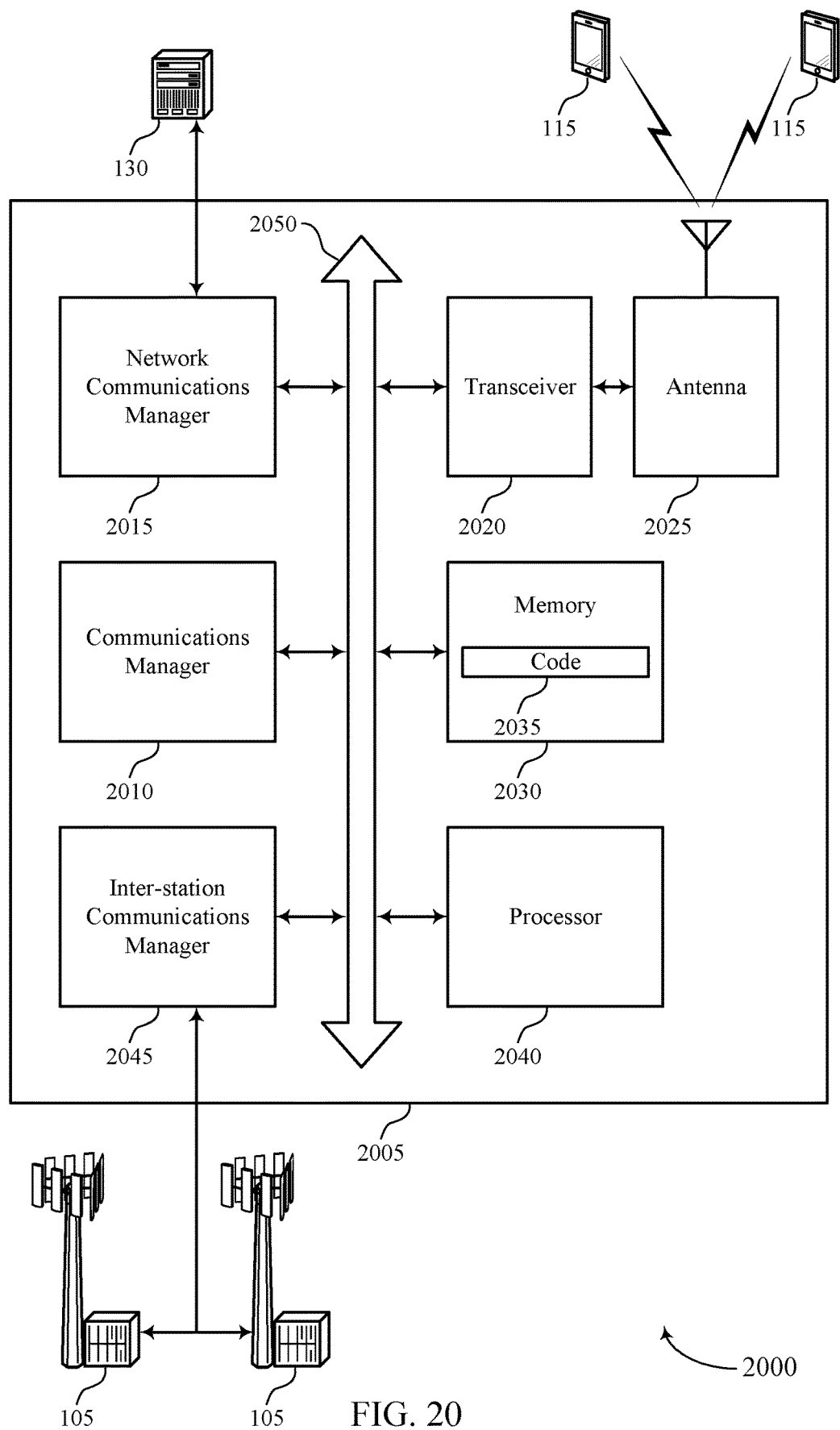
FIG. 20 shows a diagram of a system including a device that supports transmission gap configuration for random access messages in accordance with aspects of the present disclosure.

FIG. 20 shows a diagram of a system 2000 including a device 2005 that supports transmission gap configuration for random access messages in accordance with aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may transmit a random access channel configuration to at least a first UE and a second UE, where the random access channel configuration provides random access channel resources for transmission of random access messages to the base station and information for a configurable transmission gap within the random access messages, monitor the random access channel resources for one or more random access messages from at least the first UE and the second UE, and decode at least a first random access message from the first UE and a second random access message from the second UE based on a time alignment of at least a portion of the first random access message and the second random access message that is provided by the configurable transmission gap.

The network communications manager 2015 may manage communications with the core network (e.g., via one or more wired backhaul links). For example, the network communications manager 2015 may manage the transfer of data communications for client devices, such as one or more UEs 115.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting transmission gap configuration for random access messages).

The inter-station communications manager 2045 may manage communications with other base station 105, and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
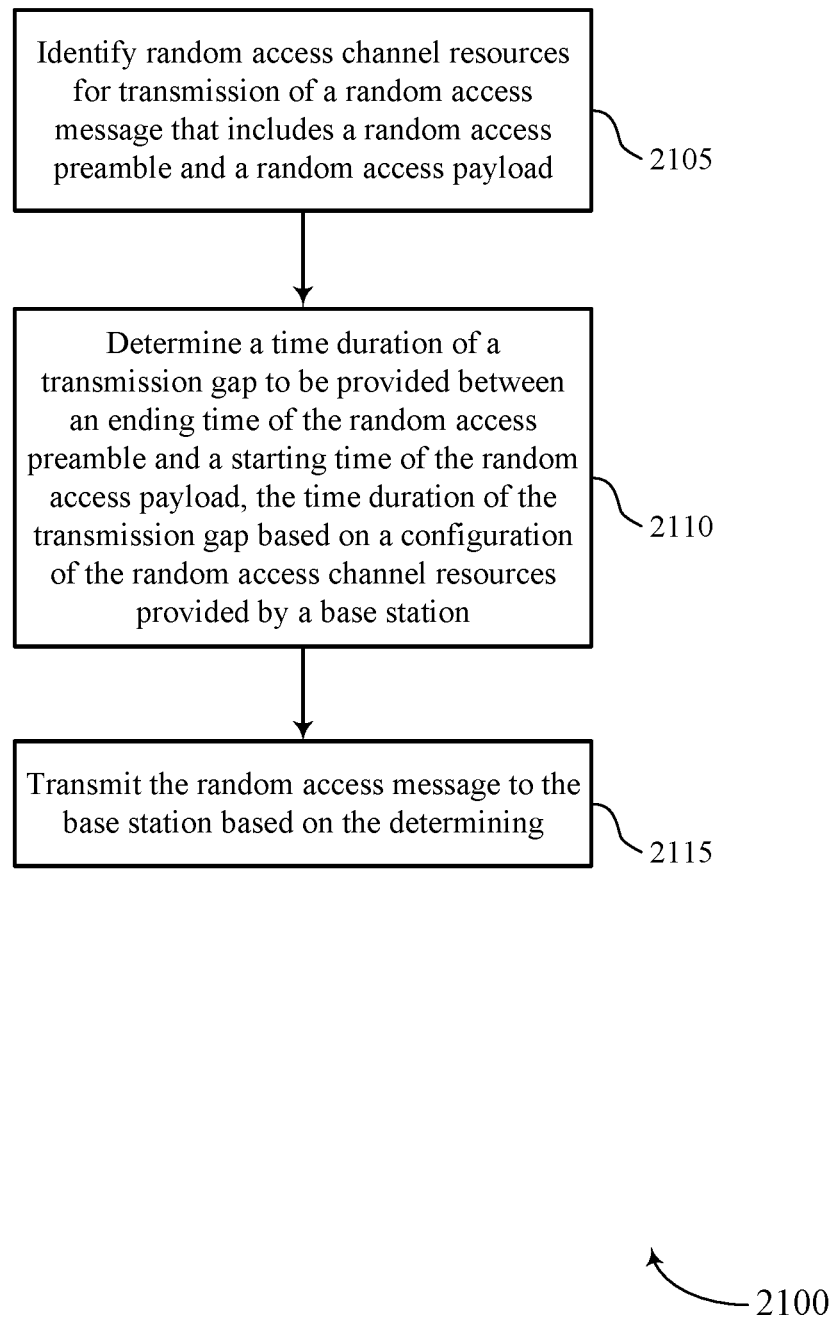
FIGS. 21 through 27 show flowcharts illustrating methods that support transmission gap configuration for random access messages in accordance with aspects of the present disclosure.

FIG. 21 shows a flowchart illustrating a method 2100 that supports transmission gap configuration for random access messages in accordance with aspects of the present disclosure. The operations of method 2100 may be implemented by a UE 115 or its components as described herein. For example, the operations of method 2100 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2105, the UE may identify random access channel resources for transmission of a random access message that includes a random access preamble and a random access payload. The operations of 2105 may be performed according to the methods described herein. In some examples, aspects of the operations of 2105 may be performed by a resource identification component as described with reference to FIGS. 13 through 16.

At 2110, the UE may determine a time duration of a transmission gap to be provided between an ending time of the random access preamble and a starting time of the random access payload, the time duration of the transmission gap based on a configuration of the random access channel resources provided by a base station. The operations of 2110 may be performed according to the methods described herein. In some examples, aspects of the operations of 2110 may be performed by a transmission gap component as described with reference to FIGS. 13 through 16.

At 2115, the UE may transmit the random access message to the base station based on the determining. The operations of 2115 may be performed according to the methods described herein. In some examples, aspects of the operations of 2115 may be performed by a random access manager as described with reference to FIGS. 13 through 16.

Figure 22:
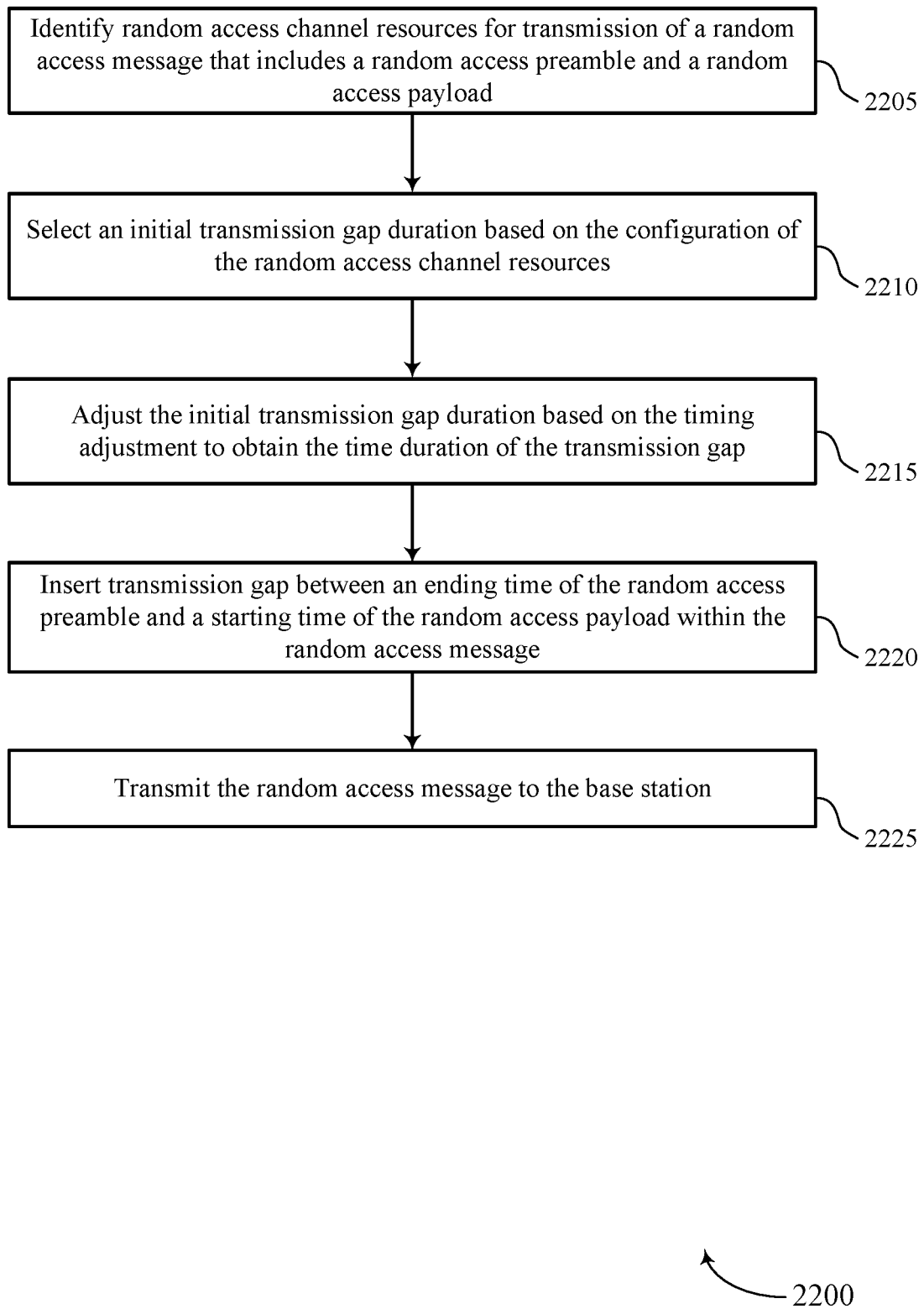

FIG. 22 shows a flowchart illustrating a method 2200 that supports transmission gap configuration for random access messages in accordance with aspects of the present disclosure. The operations of method 2200 may be implemented by a UE 115 or its components as described herein. For example, the operations of method 2200 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2205, the UE may identify random access channel resources for transmission of a random access message that includes a random access preamble and a random access payload. The operations of 2205 may be performed according to the methods described herein. In some examples, aspects of the operations of 2205 may be performed by a resource identification component as described with reference to FIGS. FIGS. 13 through 16.

At 2210, the UE may select an initial transmission gap duration based on the configuration of the random access channel resources. The operations of 2210 may be performed according to the methods described herein. In some examples, aspects of the operations of 2210 may be performed by a transmission gap component as described with reference to FIGS. 13 through 16.

At 2215, the UE may adjust the initial transmission gap duration based on the timing adjustment to obtain the time duration of the transmission gap. The operations of 2215 may be performed according to the methods described herein. In some examples, aspects of the operations of 2215 may be performed by a timing adjustment component as described with reference to FIGS. 13 through 16. In some cases, the UE may adjust the initial transmission gap duration by subtracting the timing adjustment from the initial transmission gap duration.

At 2220, the UE may insert the transmission gap between an ending time of the random access preamble and a starting time of the random access payload within the random access message. The operations of 2225 may be performed according to the methods described herein. In some examples, aspects of the operations of 2225 may be performed by a transmission gap component as described with reference to FIGS. 13 through 16.

At 2225, the UE may transmit the random access message to the base station. The operations of 2225 may be performed according to the methods described herein. In some examples, aspects of the operations of 2225 may be performed by a random access manager as described with reference to FIGS. 13 through 16.

Figure 23:
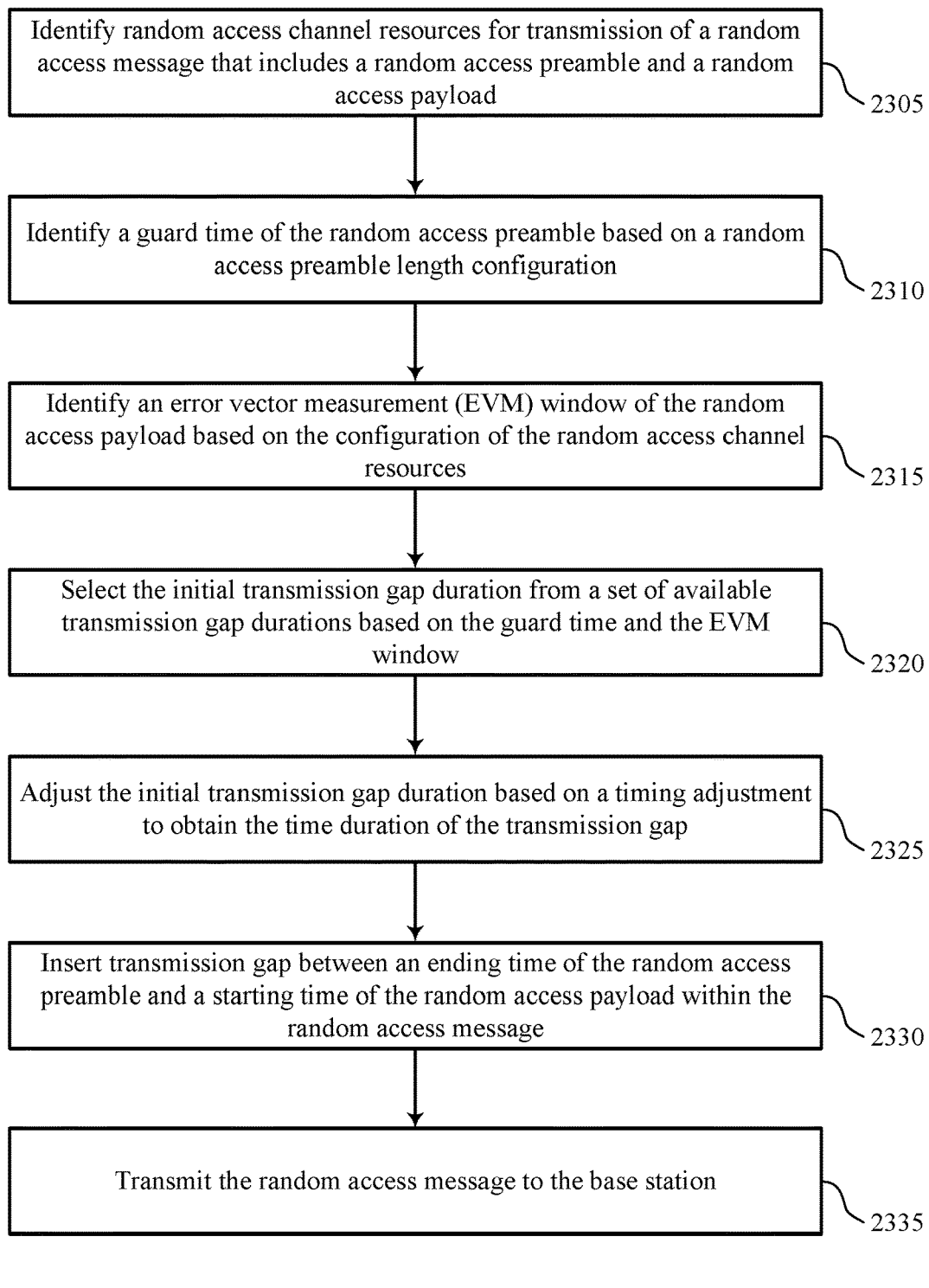

FIG. 23 shows a flowchart illustrating a method 2300 that supports transmission gap configuration for random access messages in accordance with aspects of the present disclosure. The operations of method 2300 may be implemented by a UE 115 or its components as described herein. For example, the operations of method 2300 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2305, the UE may identify random access channel resources for transmission of a random access message that includes a random access preamble and a random access payload. The operations of 2305 may be performed according to the methods described herein. In some examples, aspects of the operations of 2305 may be performed by a resource identification component as described with reference to FIGS. 13 through 16.

At 2310, the UE may identify a guard time of the random access preamble based on a random access preamble length configuration. The operations of 2310 may be performed according to the methods described herein. In some examples, aspects of the operations of 2310 may be performed by a transmission gap component as described with reference to FIGS. 13 through 16.

At 2315, the UE may identify an error vector measurement (EVM) window of the random access payload based on the configuration of the random access channel resources. The operations of 2315 may be performed according to the methods described herein. In some examples, aspects of the operations of 2315 may be performed by a transmission gap component as described with reference to FIGS. 13 through 16.

At 2320, the UE may select the initial transmission gap duration from a set of available transmission gap durations based on the guard time and the EVM window. The operations of 2320 may be performed according to the methods described herein. In some examples, aspects of the operations of 2320 may be performed by a transmission gap component as described with reference to FIGS. 13 through 16.

At 2325, the UE may adjust the initial transmission gap duration based on a timing adjustment to obtain the time duration of the transmission gap. The operations of 2325 may be performed according to the methods described herein. In some examples, aspects of the operations of 2325 may be performed by a timing adjustment component as described with reference to FIGS. 13 through 16.

At 2330, the UE may insert transmission gap between an ending time of the random access preamble and a starting time of the random access payload within the random access message. The operations of 2330 may be performed according to the methods described herein. In some examples, aspects of the operations of 2330 may be performed by a transmission gap component as described with reference to FIGS. 13 through 16.

At 2335, the UE may transmit the random access message to the base station. The operations of 2335 may be performed according to the methods described herein. In some examples, aspects of the operations of 2335 may be performed by a random access manager as described with reference to FIGS. 13 through 16.

Figure 24:
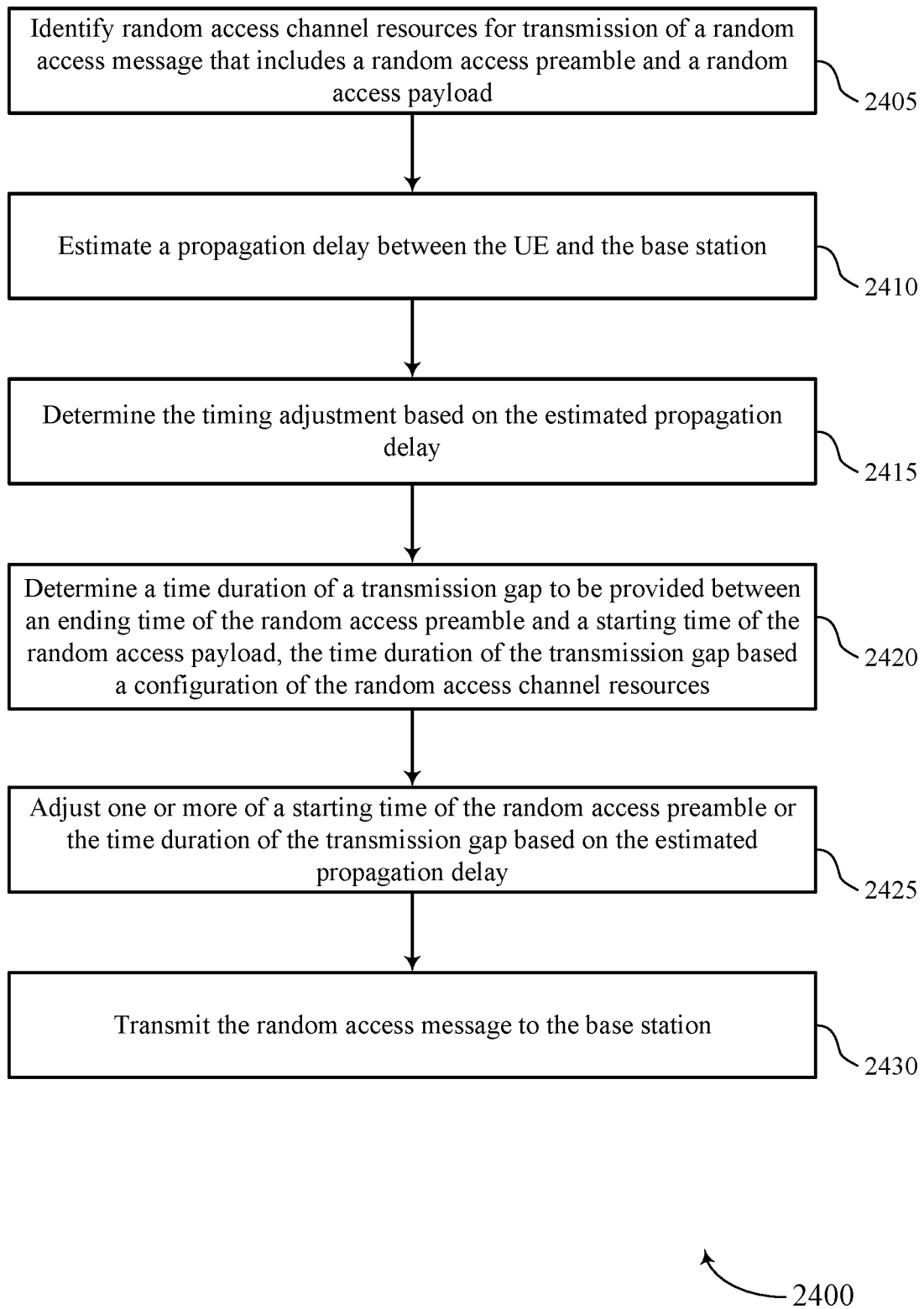

FIG. 24 shows a flowchart illustrating a method 2400 that supports transmission gap configuration for random access messages in accordance with aspects of the present disclosure. The operations of method 2400 may be implemented by a UE 115 or its components as described herein. For example, the operations of method 2400 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2405, the UE may identify random access channel resources for transmission of a random access message that includes a random access preamble and a random access payload. The operations of 2405 may be performed according to the methods described herein. In some examples, aspects of the operations of 2405 may be performed by a resource identification component as described with reference to FIGS. 13 through 16.

At 2410, the UE may estimate a propagation delay between the UE and the base station. The operations of 2410 may be performed according to the methods described herein. In some examples, aspects of the operations of 2410 may be performed by a timing adjustment component as described with reference to FIGS. 13 through 16.

At 2415, the UE may determine the timing adjustment based on the estimated propagation delay. The operations of 2415 may be performed according to the methods described herein. In some examples, aspects of the operations of 2415 may be performed by a timing adjustment component as described with reference to FIGS. 13 through 16.

At 2420, the UE may determine a time duration of a transmission gap to be provided between an ending time of the random access preamble and a starting time of the random access payload, the time duration of the transmission gap based on a configuration of the random access channel resources. The operations of 2420 may be performed according to the methods described herein. In some examples, aspects of the operations of 2420 may be performed by a transmission gap component as described with reference to FIGS. 13 through 16.

At 2425, the UE may adjust one or more of a starting time of the random access preamble or the time duration of the transmission gap based on the estimated propagation delay. The operations of 2425 may be performed according to the methods described herein. In some examples, aspects of the operations of 2425 may be performed by a timing adjustment component as described with reference to FIGS. 13 through 16.

At 2430, the UE may transmit the random access message to the base station. The operations of 2430 may be performed according to the methods described herein. In some examples, aspects of the operations of 2430 may be performed by a random access manager as described with reference to FIGS. 13 through 16.

Figure 25:
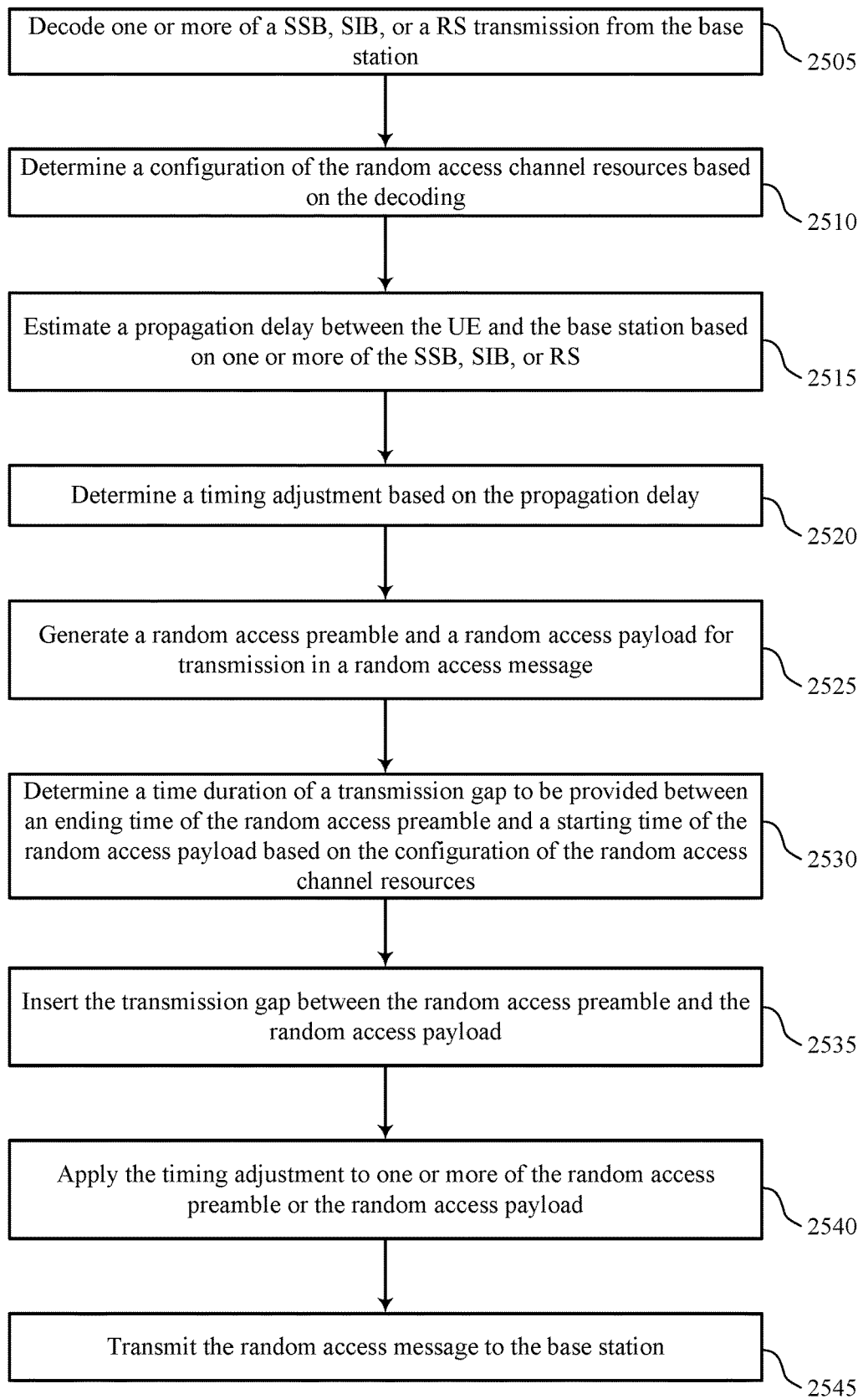

FIG. 25 shows a flowchart illustrating a method 2500 that supports transmission gap configuration for random access messages in accordance with aspects of the present disclosure. The operations of method 2500 may be implemented by a UE 115 or its components as described herein. For example, the operations of method 2500 may be performed by a communications manager as described with reference to FIGS. 13 through 16. In some examples, a UE may execute a set of instructions to control the functional elements of the UE to perform the functions described below. Additionally or alternatively, a UE may perform aspects of the functions described below using special-purpose hardware.

At 2505, the UE may decode one or more of a SSB, SIB, or a RS transmission from the base station. The operations of 2505 may be performed according to the methods described herein. In some examples, aspects of the operations of 2505 may be performed by a decoder as described with reference to FIGS. 13 through 16.

At 2510, the UE may determine the configuration of the random access channel resources based on the decoding. The operations of 2510 may be performed according to the methods described herein. In some examples, aspects of the operations of 2510 may be performed by a resource identification component as described with reference to FIGS. 13 through 16.

At 2515, the UE may estimate a propagation delay between the UE and the base station based on one or more of the SSB, SIB, or RS. The operations of 2515 may be performed according to the methods described herein. In some examples, aspects of the operations of 2515 may be performed by a timing adjustment component as described with reference to FIGS. 13 through 16.

At 2520, the UE may determine a timing adjustment based on the propagation delay. The operations of 2520 may be performed according to the methods described herein. In some examples, aspects of the operations of 2520 may be performed by a timing adjustment component as described with reference to FIGS. 13 through 16.

At 2525, the UE may generate a random access preamble and a random access payload for transmission in a random access message. The operations of 2525 may be performed according to the methods described herein. In some examples, aspects of the operations of 2525 may be performed by a random access manager as described with reference to FIGS. 13 through 16.

At 2530, the UE may determine a time duration of a transmission gap to be provided between an ending time of the random access preamble and a starting time of the random access payload based on the configuration of the random access channel resources. The operations of 2530 may be performed according to the methods described herein. In some examples, aspects of the operations of 2530 may be performed by a transmission gap component as described with reference to FIGS. 13 through 16.

At 2535, the UE may insert the transmission gap between the random access preamble and the random access payload. The operations of 2535 may be performed according to the methods described herein. In some examples, aspects of the operations of 2535 may be performed by a transmission gap component as described with reference to FIGS. 13 through 16.

At 2540, the UE may apply the timing adjustment to one or more of the random access preamble or the random access payload. The operations of 2540 may be performed according to the methods described herein. In some examples, aspects of the operations of 2540 may be performed by a random access manager as described with reference to FIGS. 13 through 16.

At 2545, the UE may transmit the random access message to the base station. The operations of 2545 may be performed according to the methods described herein. In some examples, aspects of the operations of 2545 may be performed by a random access manager as described with reference to FIGS. 13 through 16.

Figure 26:
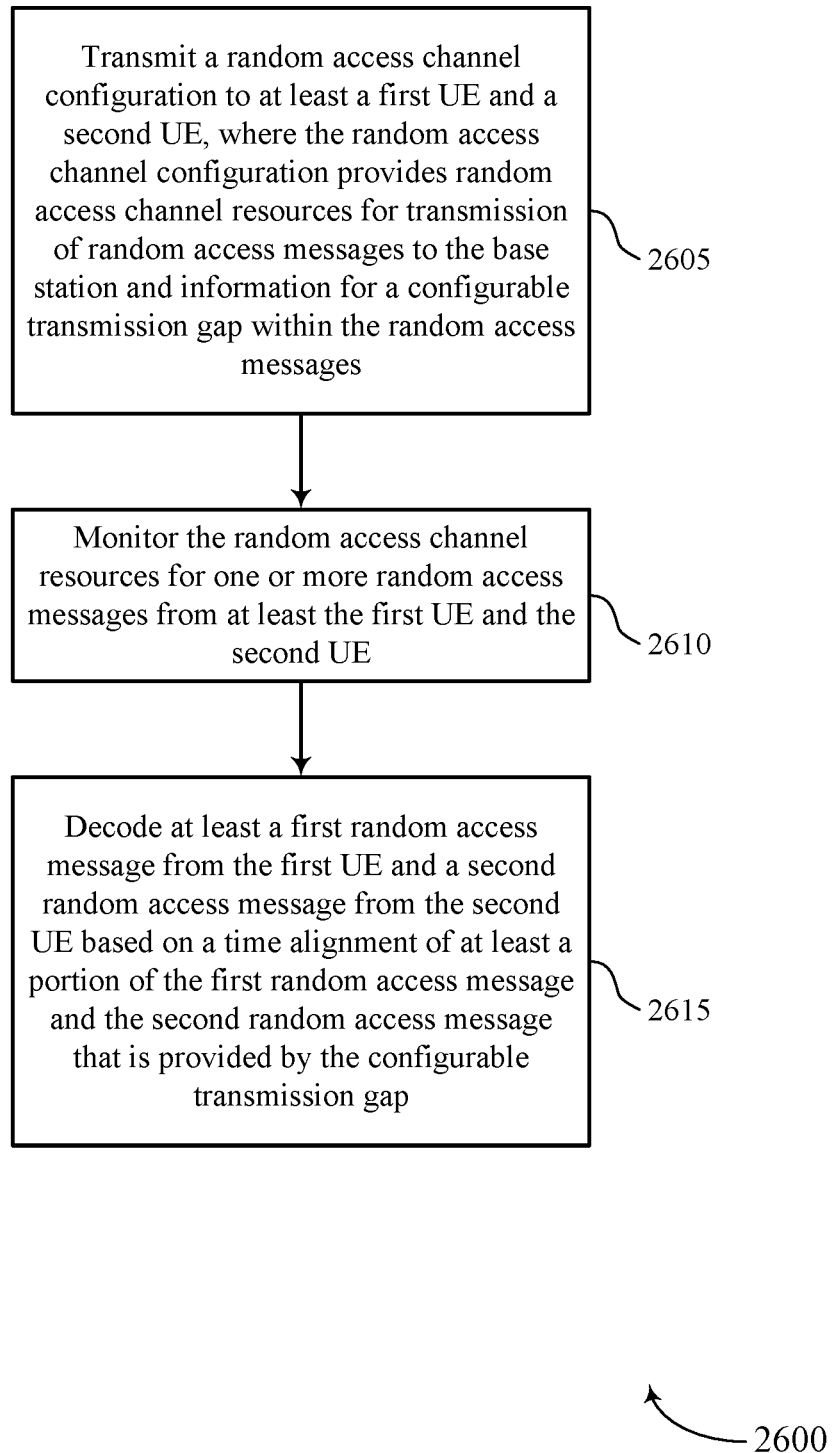

FIG. 26 shows a flowchart illustrating a method 2600 that supports transmission gap configuration for random access messages in accordance with aspects of the present disclosure. The operations of method 2600 may be implemented by a base station 105 or its components as described herein. For example, the operations of method 2600 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 2605, the base station may transmit a random access channel configuration to at least a first UE and a second UE, where the random access channel configuration provides random access channel resources for transmission of random access messages to the base station and information for a configurable transmission gap within the random access messages. The operations of 2605 may be performed according to the methods described herein. In some examples, aspects of the operations of 2605 may be performed by a configuration manager as described with reference to FIGS. 17 through 20.

At 2610, the base station may monitor the random access channel resources for one or more random access messages from at least the first UE and the second UE. The operations of 2610 may be performed according to the methods described herein. In some examples, aspects of the operations of 2610 may be performed by a random access manager as described with reference to FIGS. 17 through 20.

At 2615, the base station may decode at least a first random access message from the first UE and a second random access message from the second UE based on a time alignment of at least a portion of the first random access message and the second random access message that is provided by the configurable transmission gap. The operations of 2615 may be performed according to the methods described herein. In some examples, aspects of the operations of 2615 may be performed by a decoder as described with reference to FIGS. 17 through 20.

Figure 27:
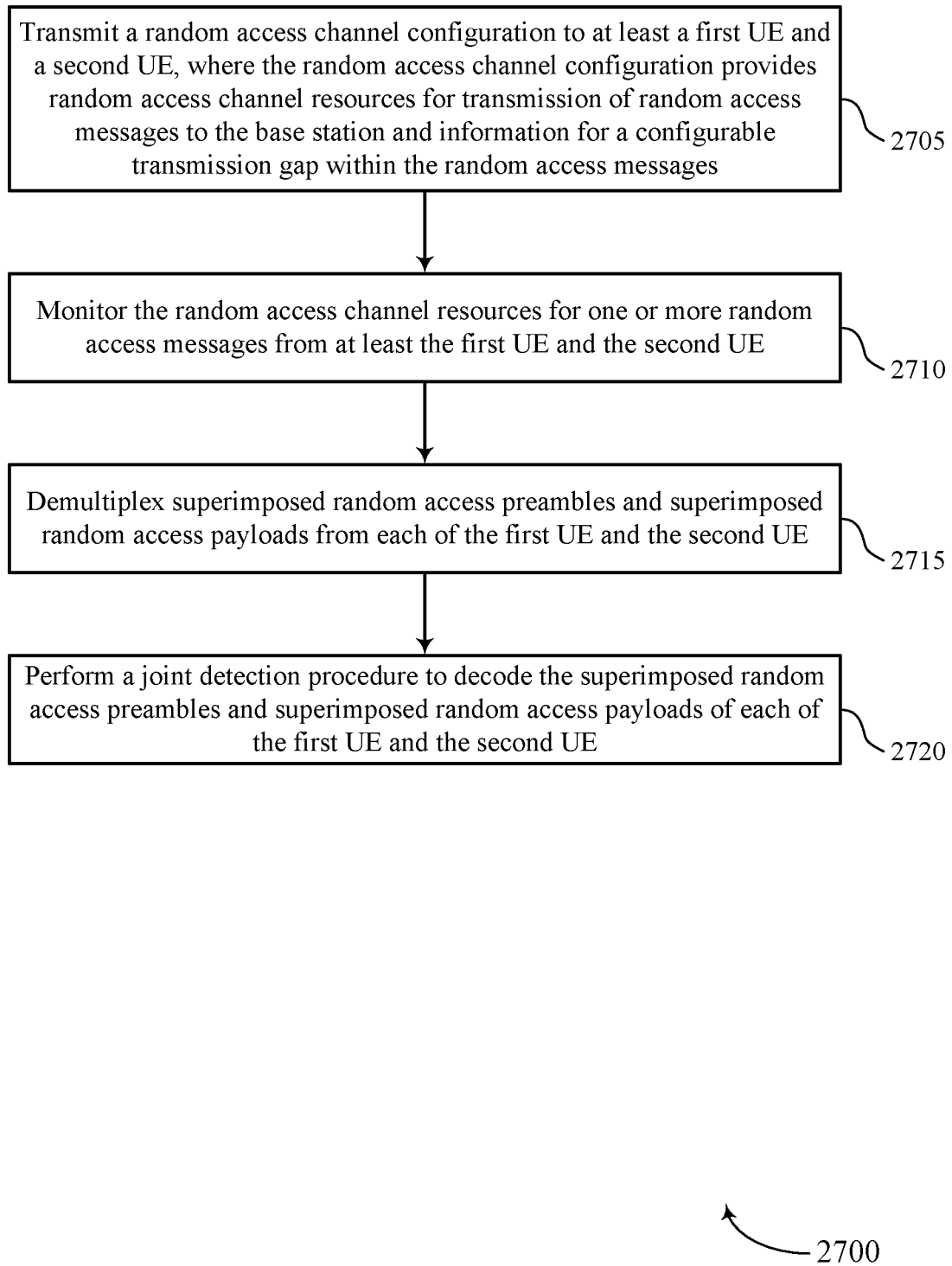

FIG. 27 shows a flowchart illustrating a method 2700 that supports transmission gap configuration for random access messages in accordance with aspects of the present disclosure. The operations of method 2700 may be implemented by a base station 105 or its components as described herein. For example, the operations of method 2700 may be performed by a communications manager as described with reference to FIGS. 17 through 20. In some examples, a base station may execute a set of instructions to control the functional elements of the base station to perform the functions described below. Additionally or alternatively, a base station may perform aspects of the functions described below using special-purpose hardware.

At 2705, the base station may transmit a random access channel configuration to at least a first UE and a second UE, where the random access channel configuration provides random access channel resources for transmission of random access messages to the base station and information for a configurable transmission gap within the random access messages. The operations of 2705 may be performed according to the methods described herein. In some examples, aspects of the operations of 2705 may be performed by a configuration manager as described with reference to FIGS. 17 through 20.

At 2710, the base station may monitor the random access channel resources for one or more random access messages from at least the first UE and the second UE. The operations of 2710 may be performed according to the methods described herein. In some examples, aspects of the operations of 2710 may be performed by a random access manager as described with reference to FIGS. 17 through 20.

At 2715, the base station may demultiplex superimposed random access preambles and superimposed random access payloads from each of the first UE and the second UE. The operations of 2715 may be performed according to the methods described herein. In some examples, aspects of the operations of 2715 may be performed by a decoder as described with reference to FIGS. 17 through 20.

At 2720, the base station may perform a joint detection procedure to decode the superimposed random access preambles and superimposed random access payloads of each of the first UE and the second UE. The operations of 2720 may be performed according to the methods described herein. In some examples, aspects of the operations of 2720 may be performed by a decoder as described with reference to FIGS. 17 through 20.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
   receiving, from a network device, a configuration of identifying random access channel resources for transmission of a random access message that includes a random access preamble and a random access payload; and
   transmitting, to the network device, the random access message based at least in part on a time duration of a transmission gap between an ending time of the random access preamble and a starting time of the random access payload, the time duration of the transmission gap being based at least in part on the configuration of the random access channel resources, and the starting time of the random access payload being aligned with a starting time of a random access occasion time window at the network device based at least in part on the time duration of the transmission gap.

2. The method of claim 1, wherein:
   the configuration of the random access channel resources is provided at least in part in one or more of a synchronization signal block (SSB), system information block (SIB), or a reference signal (RS) transmission from the network device.

3. The method of claim 1, wherein:
   the random access preamble and the random access payload are transmitted without any adjustment based on a propagation delay of transmissions between the UE and the network device.

4. The method of claim 1, wherein the random access preamble is transmitted in a first transmission slot and the random access payload is transmitted in a second transmission slot that is different than the first transmission slot.

5. The method of claim 1, wherein the random access preamble and the random access payload have one or more of a different sub-carrier spacing (SCS), transmission power, transmission channel bandwidth, transmission or receiving beam configurations, fast Fourier transform (FFT) sampling rate, or any combinations thereof.

6. The method of claim 1, wherein the determining the time duration of the transmission gap comprises:
   selecting an initial transmission gap duration based at least in part on the configuration of the random access channel resources; and
   adjusting the initial transmission gap duration based at least in part on a timing adjustment for uplink transmissions from the UE to the network device to obtain the time duration of the transmission gap.

7. The method of claim 6, wherein the adjusting the initial transmission gap duration comprises:
   subtracting the timing adjustment from the initial transmission gap duration.

8. The method of claim 6, wherein the selecting the initial transmission gap duration comprises:
   identifying a guard time of the random access preamble based at least in part on a random access preamble length configuration;
   identifying an error vector measurement (EVM) window of the random access payload based at least in part on the configuration of the random access channel resources; and
   selecting the initial transmission gap duration from a set of available transmission gap durations based at least in part on the guard time and the EVM window.

9. The method of claim 8, wherein the set of available transmission gap durations include a plurality of transmission gap durations that are mapped to different combinations of values of the guard time and the EVM window.

10. The method of claim 8, wherein at least a subset of the set of available transmission gap durations are based at least in part on a transient period time mask duration for switching a wireless transmitter at the UE between a power-on state and a power-off state.

11. The method of claim 1, wherein the random access message is transmitted using shared radio frequency spectrum, and wherein the time duration of the transmission gap is further based on a channel occupancy time of the random access message and an outcome of a listen-before-talk (LBT) procedure.

12. The method of claim 11, wherein at least a subset of a set of available transmission gap durations are based at least in part on the channel occupancy time of the random access message and the outcome of the LBT procedure.

13. The method of claim 11, further comprising:
   determining whether to adjust the time duration of the transmission gap or both the time duration of the transmission gap and a starting time of the random access preamble based at least in part on one or more measurements of one or more downlink transmissions from the network device.

14. The method of claim 1, further comprising:
estimating a propagation delay between the UE and the network device; and
determining a timing adjustment based at least in part on the estimated propagation delay, wherein the time duration of the transmission gap is further based at least in part on the timing adjustment.

15. The method of claim 1, further comprising:
decoding one or more of a synchronization signal block (SSB), system information block (SIB), or a reference signal (RS) transmission from the network device;
determining the configuration of the random access channel resources based at least in part on the decoding;
estimating a propagation delay between the UE and the network device based at least in part on one or more of the SSB, SIB, or RS;
determining a timing adjustment based at least in part on the propagation delay;
generating the random access preamble and the random access payload for transmission in the random access message;
inserting the transmission gap between the random access preamble and the random access payload; and
applying the timing adjustment to one or more of the random access preamble or the random access payload.

16. The method of claim 1, wherein the random access message is a first message of a two-step random access procedure, and wherein the method further comprises:
receiving a second message of the two-step random access procedure from the network device responsive to transmitting the first message; and
performing a connection establishment procedure with the network device based at least in part on the second message.

17. A method for wireless communication by a network device, comprising:
transmitting a random access channel configuration to at least a first user equipment (UE) and a second UE, wherein the random access channel configuration provides random access channel resources for transmission of random access messages to the network device and information for a configurable transmission gap within the random access messages;
monitoring the random access channel resources for one or more random access messages from at least the first UE and the second UE; and
decoding at least a first random access message from the first UE and a second random access message from the second UE based at least in part on a time alignment of at least a portion of the first random access message and the second random access message that is provided by the configurable transmission gap, the time alignment providing that at least the portion of the first random access message and the second random access message are aligned in time, frequency, spatial resources, or a combination thereof and allows decoding of multiple random access messages at a single random access channel occasion at the network device based at least in part on the time alignment.

18. The method of claim 17, wherein the decoding comprises:
demultiplexing superimposed random access preambles and superimposed random access payloads from each of the first UE and the second UE; and
performing a joint detection procedure to decode the superimposed random access preambles and superimposed random access payloads of each of the first UE and the second UE.

19. The method of claim 18, wherein the joint detection procedure comprises one or more of multi-user decoding (MUD) or successive interference cancellation (SIC) to decode the superimposed random access preambles and superimposed random access payloads of each of the first UE and the second UE.

20. The method of claim 17, wherein the configurable transmission gap is based at least in part on an initial transmission gap duration associated with the random access channel configuration and a timing adjustment applied to the initial transmission gap duration by each UE.

21. The method of claim 20, wherein the initial transmission gap duration is indicated by the random access channel configuration.

22. The method of claim 20, wherein the random access channel configuration indicates one or more of a guard time of a random access preamble, an error vector measurement (EVM) window of a random access payload, a transient period time mask duration for switching a wireless transmitter at each UE between a power-on state and a power-off state, or any combinations thereof.

23. The method of claim 22, wherein the initial transmission gap duration is indicated based on a set of available transmission gap durations that are mapped to different combinations of values of the guard time, the EVM window, the transient period time mask duration, or any combinations thereof.

24. The method of claim 17, wherein each of the first random access message and the second random access message is an original transmission of an initial random access message of a two-step random access procedure, or a re-transmission of the initial random access message of the two-step random access procedure, and wherein the method further comprises:
transmitting a final random access message of the two-step random access procedure to each of the first UE and the second UE; and
performing a connection establishment procedure with the first UE and the second UE based at least in part on the final random access message transmitted to the first UE and the second UE.

25. An apparatus for wireless communication at a user equipment (UE), comprising:
a processor,
memory in electronic communication with the processor; and
instructions stored in the memory and executable by the processor to cause the apparatus to:
receive, from a network device, a configuration of random access channel resources for transmission of a random access message that includes a random access preamble and a random access payload; and
transmit, to the network device, the random access message based at least in part on a time duration of a transmission gap between an ending time of the random access preamble and a starting time of the random access payload, the time duration of the transmission gap being based at least in part on the configuration of the random access channel resources, and the starting time of the random access payload being aligned with a starting time of a random access occasion time window at the network device based at least in part on the time duration of the transmission gap.

26. The apparatus of claim 25, wherein:
the configuration of the random access channel resources is provided at least in part in one or more of a synchronization signal block (SSB), system information block (SIB), or a reference signal (RS) transmission from the network device.

27. The apparatus of claim 25, wherein:
the random access preamble and the random access payload are transmitted without any adjustment based on a propagation delay of transmissions between the UE and the network device.

28. The apparatus of claim 25, wherein the random access preamble is transmitted in a first transmission slot and the random access payload is transmitted in a second transmission slot that is different than the first transmission slot.

29. The apparatus of claim 25, wherein the random access preamble and the random access payload have one or more of a different sub-carrier spacing (SCS), transmission power, transmission channel bandwidth, transmission or receiving beam configurations, fast Fourier transform (FFT) sampling rate, or any combinations thereof.

30. The apparatus of claim 25, wherein the instructions are further executable by the processor to cause the apparatus to:
select an initial transmission gap duration based at least in part on the configuration of the random access channel resources; and
adjust the initial transmission gap duration based at least in part on a timing adjustment for uplink transmissions from the UE to the network device to obtain the time duration of the transmission gap.

31. The apparatus of claim 30, wherein the instructions are further executable by the processor to cause the apparatus to:
subtract the timing adjustment from the initial transmission gap duration.

32. The apparatus of claim 25, wherein the random access message is transmitted using shared radio frequency spectrum, and wherein the time duration of the transmission gap is further based on a channel occupancy time of the random access message and an outcome of a listen-before-talk (LBT) procedure.

33. The apparatus of claim 32, wherein at least a subset of a set of available transmission gap durations are based at least in part on the channel occupancy time of the random access message and the outcome of the LBT procedure.

34. The apparatus of claim 32, wherein the instructions are further executable by the processor to cause the apparatus to:
determine whether to adjust the time duration of the transmission gap or both the time duration of the transmission gap and a starting time of the random access preamble based at least in part on one or more measurements of one or more downlink transmissions from the network device.

35. An apparatus for wireless communication at a network device, comprising:
a processor,
memory in electronic communication with the processor; and
instructions stored in the memory and executable by the processor to cause the apparatus to:
transmit a random access channel configuration to at least a first user equipment (UE) and a second UE, wherein the random access channel configuration provides random access channel resources for transmission of random access messages to the network device and information for a configurable transmission gap within the random access messages;
monitor the random access channel resources for one or more random access messages from at least the first UE and the second UE; and
decode at least a first random access message from the first UE and a second random access message from the second UE based at least in part on a time alignment of at least a portion of the first random access message and the second random access message that is provided by the configurable transmission gap, the time alignment providing that at least the portion of the first random access message and the second random access message are aligned in time, frequency, spatial resources, or a combination thereof and allows decoding of multiple random access messages at a single random access channel occasion at the network device based at least in part on the time alignment.

36. The apparatus of claim 35, wherein the instructions are further executable by the processor to cause the apparatus to:
demultiplex superimposed random access preambles and superimposed random access payloads from each of the first UE and the second UE; and
perform a joint detection procedure to decode the superimposed random access preambles and superimposed random access payloads of each of the first UE and the second UE.

37. The apparatus of claim 35, wherein the configurable transmission gap is based at least in part on an initial transmission gap duration associated with the random access channel configuration and a timing adjustment applied to the initial transmission gap duration by each UE.

38. The apparatus of claim 37, wherein the initial transmission gap duration is indicated by the random access channel configuration.

39. An apparatus for wireless communication at a user equipment (UE), comprising:
means for receiving, from a network device, a configuration of random access channel resources for transmission of a random access message that includes a random access preamble and a random access payload; and
means for transmitting, to the network device, the random access message based at least in part on a time duration of a transmission gap between an ending time of the random access preamble and a starting time of the random access payload, the time duration of the transmission gap being based at least in part on the configuration of the random access channel resources, and the starting time of the random access payload being aligned with a starting time of a random access occasion time window at the network device based at least in part on the time duration of the transmission gap.

40. The apparatus of claim 39, wherein:
the configuration of the random access channel resources is provided at least in part in one or more of a synchronization signal block (SSB), system information block (SIB), or a reference signal (RS) transmission from the network device.

41. The apparatus of claim 39, wherein:
the random access preamble and the random access payload are transmitted without any adjustment based on a propagation delay of transmissions between the UE and the network device.

42. The apparatus of claim 39, wherein the random access preamble is transmitted in a first transmission slot and the random access payload is transmitted in a second transmission slot that is different than the first transmission slot.

43. The apparatus of claim 39, wherein the random access preamble and the random access payload have one or more of a different sub-carrier spacing (SCS), transmission power, transmission channel bandwidth, transmission or receiving beam configurations, fast Fourier transform (FFT) sampling rate, or any combinations thereof.

44. An apparatus for wireless communication at a network device, comprising:

means for transmitting a random access channel configuration to at least a first user equipment (UE) and a second UE, wherein the random access channel configuration provides random access channel resources for transmission of random access messages to the network device and information for a configurable transmission gap within the random access messages;

means for monitoring the random access channel resources for one or more random access messages from at least the first UE and the second UE; and means for decoding at least a first random access message from the first UE and a second random access message from the second UE based at least in part on a time alignment of at least a portion of the first random access message and the second random access message that is provided by the configurable transmission gap, the time alignment providing that at least the portion of the first random access message and the second random access message are aligned in time, frequency, spatial resources, or a combination thereof and allows decoding of multiple random access messages at a single random access channel occasion at the network device based at least in part on the time alignment.

45. The apparatus of claim 44, wherein the means for decoding demultiplexes superimposed random access preambles and superimposed random access payloads from each of the first UE and the second UE, and performs a joint detection procedure to decode the superimposed random access preambles and superimposed random access payloads of each of the first UE and the second UE.

46. The apparatus of claim 44, wherein the configurable transmission gap is based at least in part on an initial transmission gap duration associated with the random access channel configuration and a timing adjustment applied to the initial transmission gap duration by each UE.

47. The apparatus of claim 46, wherein the initial transmission gap duration is indicated by the random access channel configuration.

* * * * *